United States Patent [19]

Schelvis

[11] Patent Number: 5,241,673
[45] Date of Patent: Aug. 31, 1993

[54] SYSTEM FOR GARBAGE COLLECTING UNUSED MEMORY SPACE REPRESENTED BY A DIGRAPH BY ASSIGNING VALUES OF NODE IDENTIFIERS TO SELECTED VARIABLES BASED UPON PREDETERMINED CONDITIONS

[75] Inventor: Marcellinus A. J. Schelvis, San Jose, Calif.

[73] Assignee: Oce-Nederland B.V., Venlo, Netherlands

[21] Appl. No.: 591,470

[22] Filed: Oct. 1, 1990

[30] Foreign Application Priority Data

Jun. 5, 1990 [NL] Netherlands .................... 9001262

[51] Int. Cl.$^5$ .................... G06F 12/00; G06F 7/00
[52] U.S. Cl. .................... 395/600; 395/425; 395/800; 364/DIG. 1; 364/381.1; 364/282; 364/245.4
[58] Field of Search .................... 364/DIG. 1, DIG. 2; 395/600, 800, 425

[56] References Cited

U.S. PATENT DOCUMENTS

| | | | |
|---|---|---|---|
| 4,121,286 | 10/1978 | Venton et al. | 364/200 |
| 4,598,361 | 7/1986 | Logsdon et al. | 364/200 |
| 4,604,694 | 8/1986 | Hough | 364/200 |
| 4,616,315 | 10/1986 | Logsdon et al. | 364/200 |
| 4,698,752 | 10/1987 | Goldstein et al. | 364/200 |
| 4,755,939 | 7/1988 | Watson | 364/300 |
| 5,161,216 | 11/1992 | Reps et al. | 395/375 |

OTHER PUBLICATIONS

"Transaction Management in the R* Distributed Database Management System", by Mohan et al., ACM Transactions on Database Systems, vol. 11, No. 4, Dec. 1986.

"The Smalltalk-80 Virtual Machine", by G. Krasner, BYTE Publications, Inc., Aug. 1981, pp. 302–4,6,8,10,12,14,16–18,20.

"The Implementation of a Distributed Smalltalk", by M. Schelvis et al., ECOOP '88 proceedings, Lecture Notes in Computer Science 322, Springer-Verlag, pp. 212–232.

*Primary Examiner*—Thomas C. Lee
*Assistant Examiner*—Peter Y. Wang

[57] ABSTRACT

A method of distributing status information is described, regarding a digraph in a logically organized system of groups of entities related to each other and to be represented by digraphs, and a device for using such a method. In a system which comprises a number of groups which may be represented by digraphs, the lacking of a node having a particular status in a group is detected by the method. When applying the method to a distributed object-oriented system, in which a root is such a node having a particular status, incremental distributed garbage collection is realized. The invention is also effective in the case in which cycles or subcycles occur in graph of objects referring to each other. Upon realizing garbage collection, inaccessible data information occupying memory space is removed from memory to thereby free previously occupied memory space.

15 Claims, 7 Drawing Sheets

SYSTEM FOR GARBAGE COLLECTING UNUSED MEMORY SPACE REPRESENTED BY A DIGRAPH BY ASSIGNING VALUES OF NODE IDENTIFIERS TO SELECTED VARIABLES BASED UPON PREDETERMINED CONDITIONS

The present invention is directed to a method of distributing status information regarding a digraph in a logically organized system of groups of entities related to each other and to be represented by digraphs, and a device for using such a method. It further relates to a method of "garbage collection" in a computer network system (garbage collection being deletion of obsolete data from a memory).

The invention relates to a method of distributing in a logically organized system including an assembly of groups of related entities, each of the groups to be represented by a digraph and each of the entities to be represented by a node of a digraph, status information regarding the digraph about the nodes of the digraph in which, per digraph, an identifier of a unique value is associated with each node and in which a set of elements is associated with each node not having a particular status. Further, each element of the set represents a variable which is coupled separately to an immediate predecessor of the node (being a successor node of the predecessor). The invention further relates to a device for using such a method.

BACKGROUND OF THE INVENTION

A conventional method is known as described in the article: M. Schelvis and E. Bledoeg: "The implementation of a Distributed Smalltalk", ECOOP'88 proceedings, Lecture Notes in Computer Science 322, Springer-Verlag, pp. 212-232 (1988), which is incorporated by reference herein. This article describes a method for exchanging packet-bound information as it is used in a distributed object-oriented system, such as that of the Smalltalk-80 system, on behalf of the distributed reclamation of memory space, hereinafter referred to as "Distributed Garbage Collection". The Smalltalk-80 system is further described in an article by Glenn Krasner entitled "The Smalltalk-80 Virtual Machine", BYTE, August 1981, pp. 300-320 (1981), which is incorporated by reference herein.

The aforementioned "Smalltalk-80" article describes the Smalltalk system as one type of object-oriented system which can be represented by a digraph. The system encourages development of large applications programs. The system contains a compiler, a debugger, a storage management system, text and picture editors, and a file system. To aid in the understanding of the system in which the methods of "garbage collection" of the present invention can be used, the Smalltalk-80 system will be subsequently described. However, it should be noted that the present invention is not limited to operation on only the Smalltalk-80 system. Such a system is merely being described for exemplary purposes and should not be considered in any way to limit the scope of the present invention.

The pieces contained in the system described in the "Smalltalk-80" article (the compiler, the debugger, . . . , etc.) can be written in Smalltalk-80 and are called the "Smalltalk-80 Virtual Image". The remaining part of the Smalltalk-80 system is defined in terms of an abstract machine called the "Smalltalk-80 Virtual Machine". The Smalltalk-80 compiler translates source code into machine instructions for this virtual machine, rather than translating directly into machine instructions for a particular hardware machine. Therefore, the implementation of the Smalltalk-80 system onto any actual computer (such as a SUN computer, for example), hereinafter referred to as a "target" computer, includes implementing of (writing a program to simulate) the Smalltalk Virtual Machine on the target computer.

Such a system as the Smalltalk-80 system is made up of objects that have state and exhibit behavior. Their state includes values of indexed and name variables, called fields, and their behavior is exhibited through sending and receiving messages. Programming in Smalltalk-80 is done by defining the procedures, or methods, that are executed when objects receive messages. Typically, messages are sent to other objects to invoke their methods. The fields mentioned before, are, most of the time, containers for a pointer to another object (for performance optimization, the values in the fields of some objects will be interpreted as the numerical values themselves, rather than as object pointers). A group of objects referring to each other, by means of these pointers, also including a pointer to the object-class (which is itself also an object) constitutes a directed graph with the objects being nodes and the references or pointers (through which messages can be transmitted from node to node) being edges. Some objects are accessible from outside the graph and are termed "root objects". Objects live if they have a root, i.e., if they are accessible via a path through the graph starting from a root-object. The object of garbage collection is to reclaim memory space which is occupied by "dead" objects which are objects that are no longer accessible and are hence useless.

An object's graph is a directed graph for each of the connection points are all objects than can be accessed from the root object via a path of inter-object references (the graph's branches). If roots of the objects are shared, the objects are called identical.

An object represents a component of the Smalltalk-80 software system. For example, objects represent: Numbers; character strings; queues; dictionaries; rectangles; file directories; text editors; programs; compilers; computational processes; financial histories; and views of information. An object consists of some private memory and a set of operations. The nature of the operations of the object depend on the type of component it represents. Objects representing numbers compute arithmetic operations. Objects representing data structure store and retrieve information. Objects representing positions and areas answer inquiries about their relation to other positions and areas.

A message is a request for an object to carry out one of its operations. A message specifies which operation is desired, but not how that operation should be carried out. The receiver, the object to which the message was sent, determines how to carry out the requested operation. For example, addition is performed by sending a message to an object representing a number. The message specifies that the desired operation is addition and also specifies what number should be added to the receiver. The receiver determines how to accomplish the addition.

The set of messages to which an object can respond is called its interface with the rest of the system. The only way they interact with an object is through its interface. A crucial property of an object is that its private memory can be manipulated only by its own operations. A crucial property of messages is that they are the only way to invoke an object's operations. These properties ensure that the implementation of one object cannot depend on the internal details of other objects, only the messages to which they respond.

An example of a commonly-used data structure and programming is a dictionary, which associates names and values. In the Smalltalk-80 system, a dictionary is represented by an object that can perform two operations: associate a name with a new value, and find a value last associated with a particular name. A programmer using a dictionary must know how to specify these two operations with messages. Dictionary objects understand messages that make requests like "associate the name Brett with the value 3" and "what is the value associated with the name Dave?" Since everything is an object, the names, such as Brett or Dave, and the values, such as 3 or 30 are also represented by objects. Although a curious programmer may want to know how associations are represented in the dictionary, this internal implementation information is unnecessary for successful use of a dictionary. Knowledge of a dictionary's implementation is of interest only to the programmer who works on the definition of the dictionary object itself.

Garbage collection is often used in systems in which memory is organized as a "heap", for example, in Smalltalk or Lisp systems. In creating an object in Smalltalk systems, memory space of the heap is assigned hereto dynamically. Description of this memory space and further the relationships between objects and memory, will be subsequently be described.

It should be noted that the Smalltalk Virtual Machine includes three elements which must be implemented: The storage manager; the interpreter; and the primitive subroutines. To implement the storage manager, information is necessary to represent objects in the computer's memory. This information includes the amount of memory that each object will occupy, which can be computed from the number of fields the object has, and the representation of fields in the memory. Thus, the storage manager for objects in a Smalltalk-80 system will fetch a particular class of objects, fetch and store fields of objects, create new objects, and collect and manage free space. It is the maintenance of free space to which garbage collection is essentially directed to. This process will be explained subsequently in greater detail.

The interpreter executes the machine instructions of the Smalltalk-80 Virtual Machine. Information needed to design the interpreter is a description of these machine instructions call byte codes. The byte codes are contained in methods, so the representation of methods must also be known. From this information it can be decided how the interpreter will fetch and execute byte codes and how methods will be found to run when messages are sent.

Finally, it must be determined which messages will invoke primitive subroutines (which will be described subsequently in greater detail). Thus, while typically messages are sent to other objects to invoke their methods, sometimes messages invoke primitive (machine-code) subroutines rather than Smalltalk-80 methods. Accordingly, it must be determined which methods must be implemented in machine code to terminate the recursion of message sending and optimize performance.

Everything in a Smalltalk system is an object, so from the storage point of view memory needs to be divided into blocks, one for each object, plus a pool of memory that is not yet used. Every time a new object is created, a new block of the appropriate size must be found for that object. Further, when objects are no longer used, their memory block may be returned to the pool of unused memory.

An object pointer is assigned each object. The object pointer is an indirect pointer to the object through a table kept by the storage manager. This allows the storage manager to move an object around in memory without affecting any object that refers to it. It also ensures that the storage manager is the only entity in the system concerned with (and allowed to change) the actual memory. In the Smalltalk-80 Virtual Image, object pointers are single 16-bit words. The storage manager keeps the length of the block as one word of the block, one word which is the object pointer of the object that describes class, and fields of the object which are in themselves objects. Accordingly, if the object is of a class description such as a "point", one word must be kept which is the object pointer of an object that is the X coordinate field of the point and one must be kept which is the Y coordinate field of the point. Similarly, if the object is of the class "triangle", one word must be kept that is the object pointer of an instance of class "point", representing one vertex field, as well as one for the second vertex field, and one for the third vertex field. Still further, for performance optimization, the values in the fields of some objects, such as those of a class "Byte Array" will be interpreted as the numerical values themselves, rather than object pointers.

The purpose of the storage manager is to fetch and store fields of objects, to create objects, and to manage free space. Requests can be made for new storage, by calling a particular subroutine, but not to return new storage. In some other systems, storage that is no longer used must be explicitly returned to the free storage pool. The Smalltalk-80 philosophy is that neither the user nor any part of the system other than the storage manager need have such concerns. Therefore, the storage manager must know which objects are no longer being used, so that their storage may reenter the free storage pool. Accordingly, it is this proper management of freeing up memory space, relating to objects which are not accessible via path through their graph starting from a root-object, and thus removing them from memory and returning the particular portion of memory to a free storage pool, which requires a method of garbage collection. This information which is no longer essential for any purpose must be removed from memory to free up the memory for other future use. This involves garbage collection.

The interpreter of the Smalltalk-80 Virtual Machine performs the actions described in the byte codes of methods (the machine code of the Virtual Machine). The information needed to implement the interpreter does a description of the byte codes, the representation of methods, and the technique defined the method to run when sending a message. The Smalltalk-80 Virtual Machine, in a corresponding byte codes set, are stack oriented. However, the difference between the Smalltalk-80 Virtual Machine and procedure-based machines is the way the procedure is found. In the Smalltalk-80 system only the "name", called the selector, of the messages provided, the method to be executed being found through a strategy involving the received message and its class. Accordingly, object pointers are pushed and popped from a stack, and when a message is sent, the top few elements of the stack are used as receiver and arguments of the method.

Methods are implemented as object whose fields contain the byte codes plus a group of pointers to other objects called the literal frame. The interpreter can use a particular subroutine of the storage manager to fetch the next required byte code to execute. This takes care of returns, jumps, and pops, but for the other byte codes more information must be represented. In particular, for the push and store byte codes, it must be represented where to find the object pointers to push. Further, for the second byte codes, we need to represent where to find the selector of the message and which stack elements are the receiver and arguments.

The source code for a method contains variable names and literals, but the byte code to the Virtual Machine are defined only in terms of field offsets. From the Virtual Machine's point of view, there are three types of variables: Variables local to the method (called temporaries); variables local to the receiver of the message (instance variables); or variables found in some dictionary that the receivers' class shares (global variables). Class variables are treated in the same way as other global variables. The Smalltalk-80 compiler (itself written in Smalltalk-80) translates references to these variables into byte codes their references to field offsets of the receiver, the temporary, or globals. The instance variables are translated using a field of class-describing objects that associate instance variable names with field offsets. The assignment of offsets to temporaries is done when the compiler translates a method by associating names of temporaries to offsets in the temporary area. The compiler creates instances for literals, puts their object pointers into the literal frame of the method, and produces byte codes in terms of offsets into the literal frame. For global variables, the compiler uses system dictionaries that associate global names to indirect references to objects. Object pointers of the indirect references to the global objects are also placed in the literal frame of method. The byte codes for accessing globals are encoded as indirect references through field offsets in the literal frame.

Therefore, when the interpreter is executing a method, it has to keep a stack, a temporary area, a pointer to the receiver and arguments of the method, and a pointer to the method itself. It uses the storage managers subroutines to push and pop pointers from the stack object, to receive and set values of variables in the temporary area, to retrieve and set values of variables of the receiver, and to get byte codes and values of global variables from the method.

When a message is sent, the receiver and arguments must be identified, and the appropriate method must be found by the interpreter. The technique used in Smalltalk-80 is to include in each class-describing object a dictionary, called the method dictionary, that associates selectors with methods. Pointers to the selectors that will be sent by any method are kept in the method (along with global variable pointers and byte codes). The byte codes that tell the interpreter to send a message and code a field offset in a literal frame where the selector is found, plus the number of arguments that the method needs. By convention, the top elements of the stack are the arguments and the next one down are the receivers.

If no such association is found, the searching does not end. The receivers class may be a subclass of another class, called its superclass. If this is the case, the method may be defined in the superclass, so the interpreter checks here. This means that each class must have a field that refers to its superclass. Interpreter search is the method dictionary of the superclass, its superclass and so on, until either an appropriate method is found or it runs out of superclasses, in which case an error occurs.

The Smalltalk-80 Virtual Machine implementation is a program running in the machine language of the target computer. The storage manager is the collection of subroutines in the program that deals with memory allocation and deallocation. The interpreter is the collection of subroutines in this program, one which fetches the next byte code from the currently running method and calls one of the others to perform the appropriate action for that byte code.

In addition to these functions there are several other places in the Smalltalk-80 system which performance considerations make it necessary, or at least desirable, to implement certain functions as machine code subroutines in the Smalltalk-80 Virtual Machine. These places are: Input/output, connecting the Smalltalk-80 system to the actual hardware; basic arithmetic functions; fetching and storing indexable instance variables; screen graphics utilizing drawing and moving areas of the screen bit map quickly; and objection allocation, connecting the Smalltalk-80 code for creating a new instance with the storage manager subroutines. This set of subroutines are called primitive subroutines.

The primitive subroutines are represented in the Smalltalk-80 Virtual Image, this method with special flag that says to run the corresponding subroutine rather than Smalltalk-80 byte codes. When the interpreter is executing the code to send a message and finds one of the flags set, it calls the subroutines and uses the value returned from it as the value of the method. A number of these methods in Smalltalk-80 is small, in order to keep the rest of the system as flexible and extensible as possible.

Accordingly, the Smalltalk-80 Virtual Machine should be recognized as a fairly small computer program that consists of the storage manager, an interpreter, and a set of primitive subroutines. The task implementing a Smalltalk-80 Virtual Machine for a new target computer is not too large because most of the functions that must usually be implemented in machine code are already part of the Smalltalk-80 Virtual Image that runs on top of the Virtual Machine.

It should further be noted that a system such as the Smalltalk-80 Virtual Machine, while be discussed as a fairly small computer program, could also be implemented in hardware. Such an implementation would sacrifice some of the flexibility of the software, but it would result in the performance benefits that hardware provides. Hardware assets to a system such as the Smalltalk-80 Virtual Machine software can greatly improve performance. Writable microcodes storage for the pieces of code that are frequently run, hardware assets for graphics or hardware assets for the fetching of bright codes could all potentially improve the performance of Smalltalk-80 Virtual Machine implementation.

In the article entitled "The Implementation of a Distributed Smalltalk", a number of systems are discussed which are designed for distributed garbage collection.

The article further states a plurality of specific disadvantages described in the conventional system. These disadvantages, as well as discussion of the distributed Smalltalk system will subsequently be discussed.

Distributed Smalltalk comprises a number of cooperating Smalltalk Virtual Machines, as was previously described, distributed over a network, that provide complete distribution transparency to the image level, including transparent messages passing across machine boundaries. As a result, no modifications are necessary at the image level and thus the standard Smalltalk debugger can be used for system wide debugging. However, in such a network system, garbage must be collected not only from a single Virtual Machine, but from a plurality of Virtual Machines whose object may be interconnected in order to establish a path starting from a root-object, indicating that an object should live. Thus, distributed garbage must be collected over such a system. It should be noted that the distributed Smalltalk system, to be hereinafter described, is only an exemplary system to which methods of "garbage collection" of the present invention can be utilized. Further, it should be noted that the present invention is not limited to operation of a distributed Smalltalk system. Such a system is merely described for exemplary purposes and should not be considered in any way to limit the scope of the present invention. Garbage collection, by the methods and device of the present invention, can be utilized in any computer network system, for example, which can be represented by a digraph. Further, the overall invention is certainly not restricted to object-oriented systems. One aspect of the present invention, could, for instance, be a distributed document management system, programmed in C and running one a number of interconnected personal computers.

In a distributed programming system such as that of distributed Smalltalk, the system is completely distribution transparent. Distribution transparency implies that programmers writing distributed applications, such as multiauthoring document systems, e-mail or calendar systems, need not worry about object access, network location, replication, currency control, etc. Distributed Smalltalk is based upon an existing implementation of Smalltalk and is implemented on a network of SUN computers running Berkeley, UNIX.

Distributed systems in applications are inherently more complex to program than non-distributed ones. Accordingly, object-oriented languages like Smalltalk-80 allow programmers to construct applications in terms of communicating objects. Objects are an excellent way to structure a distributed system because they provide a means for data encapsulation. Data encapsulation is a powerful mechanism for controlling access to share data.

The Smalltalk programming system can be seen as a set of objects that communicate with each other and with the user in a defined way. The Smalltalk system provides functions like storage management, display handling, text and picture editing, compiling and debugging. The Smalltalk system consists of a virtual image and a Virtual Machine as previously discussed.

It is the Virtual Image which comprises the set of all objects. An object is a representation of a real world entity such as a display screen, or an abstract entity such as a number. Objects communicate with each other by sending messages, as previously described, a message specifying the name of the receiver object, the name of the operation, and a list of object names as arguments. A message only specifies which operation has to be performed. The receiver of the message determines how the operation will be carried out.

A class is a set of equivalent objects, a class being itself an object. It describes the private data and set of operations of its instances. The private data of an object is described by its instance variables. An instance variable being a name which refers to one object, called its value.

Smalltalk-80 is a single user programming system, as previously described. Multiple Smalltalk programmers can exchange objects only by writing objects (or source code) into a file, transferring the file over the network and reading the file destination. The Smalltalk Virtual Machines are enriched with some primitives that enable inner-Virtual Machine communication, and the images with specific objects that make use of these new primitives in order to send messages to each other over the network. By utilization of this distributed system, advantages of the image level approach can take place such as: no substantial changes have to be made to the Virtual Machine and hence it is relatively easy to make Virtual Machines from different vendors work together; and no performance is lost during local operation.

In the past, problems existed with an image level approach. One problem, dealing with input/output existed when a remote Virtual Machine was executing some method for one person, and within this method a message is set to the object display. Accordingly, one person would want things to happen on their screen and not the screen of a colleague. Other problems existed with standard classes on different host computers and a further problem existed with regard to Smalltalk processes. With the image level approach, during a remote execution there are several Smalltalk processes involved, at least one sender and one receiver process. Therefore, the Smalltalk debugger could not be utilized for remote debugging.

These problems were solved by the concept of distribution transparency at the image level. This provided that all consequences of distribution were concealed from the image, and therefore also from applications and users. As a result of distribution transparency, all object in the system could be referenced in the uniform manner regardless of factors such as access, location, migration and replication. Since distribution transparency had to be provided by the Virtual Machines, the approach was entitled a "Virtual Machine Level" approach. When a message was sent to one object, the Virtual Machine knew whether the object was local, remote or replicated. Further, if it was remote, the machine knew where or how to find it and if it was replicated, how to select the appropriate replica. If the receiver happened to be a local object, the local Virtual Machine handled the message just like an ordinary stand-alone Virtual Machine. If the receiver was remote, however, the message was forwarded to the remove Virtual Machine. As a result objects on different Virtual Machines could work together as if they were on the same host.

With regard to the Virtual Machine level approach, a number of Virtual Machines are capable of localizing objects and doing remote sends on one standard Smalltalk image. The objects of the standard image can thus be distributed at random over the plurality of Virtual Machines. The resulting system, however, still leads to a single user system since there is only one display object, one input sensor, etc. and worse, they are on different machines. Accordingly, the system was improved such that extra objects on every Virtual Machine were made which represented the functionality of the underlying hardware, for example, display, sensor, processor, schedule controller. These objects were called host objects (a host is a Virtual Machine plus image). However, since multiple objects are now associated with the same name, selectibility of the right object was a problem.

To reduce network traffic between machines, multiple copies (replicas) of heavily used objects were created, one for each host. Accordingly, host objects like display carry the flag "home" in their header, and process objects contained an instance variable containing the identity of the host where their process was initiated (their home). When a receiver was flagged "home" then the message sent to it was forwarded to the home of the current process. These objects flagged home were entitled "home objects".

An important part in designing Smalltalk-80 programs exists in determining which kinds of objects should be described and which message names provide a useful vocabulary of interaction among these objects. A language is designed whenever the programmer specifies the messages that can be sent to an object. An appropriate choice of objects depends, of course, on the purposes to which the object will be put and the granularity of information to be manipulated. For example, if the simulation of an amusement park is to be created for the purpose of collecting data on queues at the various rides, then it would be useful to describe objects representing the rides, workers who control the rides, the waiting lines, and the people visiting the park. If the purpose of the simulation includes monitoring consumption of food in the park, then the objects representing the comsumable resources are required.

In distributed Smalltalk, objects within a local object space are uniquely identified and addressable by means of their object-oriented pointer. Sometimes objects are addressed indirectly, and the object-oriented pointers or pointer to a "forwarding object", a Smalltalk object that contains the actual pointer. Forwarding objects are not visible within the Smalltalk image, but for the Virtual Machine they are ordinary objects.

The problem of garbage collection is that of reclaiming space occupied by "dead" objects, which is data that has been inaccessible. All data (objects) in a heap oriented system form a graph structure of objects pointing to one another. This graph contains some rude objects, which are accessible by definition. Objects live when they are accessible via a path of pointers starting from a root. Otherwise, they are dead.

One conventional method of garbage collection, utilized in connection with the distributed Smalltalk system, is that of a garbage collection based upon a lifetime of objects, called general generation scavenging. Newly created objects are stored in New Space. When New Space is filled up, New Space and Survivor Space are garbage collected with a copy via graph traversal called scavenging. The roots of this graph are the set of New Survivor objects referenced from Old Space, Replica Space or remote hosts. This route is dynamically updated by checking on stores of pointers to New Space and spaces. The objects in this graph are moved to a new Survivor Space, except for old enough objects, which are moved to Old Space. At the end of a traversal, New Space is empty. Since most new objects die soon, Old Space fills up relatively slowly, and therefore garbage collection of much bigger Old Space and Replica Space is necessary much less frequency.

However, one problem which exists in generation scavenging in that cyclic structures cannot be detected by this system. Accordingly, if a first object is connected to a second object which is further connected to the third object, and the third objection is connected back to the first object, garbage collection cannot occur immediately via generation scavenging. One has to wait until, by aging, distributed cyclic garbage is supposed to end up in the oldest generation of objects, and thus becomes local cyclic garbage, which can then be collected. Therefore, a system is desired which can detect and breaks cycles of roots via a plurality of connectable objects and can further detect objects which do not trace back to a root to thereby reclaim memory space occupied by these "dead" objects.

A further conventional system exists utilizing a type of mark and sweep scavenging. This is termed "reorganization". In Smalltalk, for example, the Old Space is garbage collected on user-request utilizing this mark and sweep system with a file as temporary space. For distributed Smalltalk, scavenging is done within a background Smalltalk process, such that each time it is active it copies a few living Old Space objects from one side of the Old Space to the other. With the distributed Smalltalk system, however, a global mark and sweep type system is necessary. Thus, is order to discover dead objects in a distributed system, all hosts should be checked as having pointers to a particular object. The graph of living objects is traversed, the objects accessed are marked, and at the end the space of unmarked objects is reclaimed or "swept". The global mark and sweep type system, however, does not work properly when all hosts are not able or willing to cooperate. This is an important problem because in an average distributed system, this is likely to be the case.

A still further conventional method of garbage collection is the type known as reference counting or waited reference counting. Reference counting is an object-based method which concentrates on the death of individual objects. Object-based methods keep track of the incoming pointers of each object, for example, by dynamically updating a count of them. When the count equals zero, the object is dead and space is reclaimed. This system, however, is clearly even less efficient than the previously mentioned systems, because it suffers from the deficiency of not being able to collect local cyclic garbage, let alone distributed cyclic garbage.

SUMMARY OF THE INVENTION

The present invention is therefore directed to a system and methods for garbage collection in a computer network system. It is desired to create a system which can collect all objects that are dead and only those objects which are dead. The invention relates not only to a garbage collection method in an object-oriented system, such as the distributed Smalltalk system, but further relates to any system which can be described as a directed graph with nodes having a particular status. Thus, the invention relates to a method of distributing status information regarding a digraph in a logically organized system of groups of entities related to each other and to be represented by digraphs, and further device for using such a method.

Accordingly, it is an object of the present invention to design a method and device for garbage collection in a computer network system which reclaims memory space occupied by dead objects.

It is a further object of the present invention to create a garbage collection system which collects distributed garbage incrementally and concurrently with user activity.

It is a further object of the present invention to create a garbage collection system which operates independent of computer units in a network being temporarily inaccessible and further unsynchronized with other computer units in the network system.

It is a further object of the present invention to create a garbage collection system which is suited for distributed graphs with subcycles.

It is a further object of the present invention to create a garbage collection system which is suitable for distributed graphs without subcycles.

It is still further object of the present invention to create a garbage collection system which operates independent of roots of the living structures moving from one host computer unit to another, within the network.

It is a still further object of the present invention to create a method, in a logically organized system including an assembly of groups of related entities, each of the groups being represented by a digraph and each of the entities being represented by a node of a digraph, distributing, status information regarding the digraph about the nodes and which, per digraph, unique identifiers associated with each node and in which a set is associated with each node which does not have a particular status.

It is a still further object of the present invention to utilize timestamps as object or node identifiers as a unit of graph information to detect the death of the distributed graph by a node with the highest timestamp at the time of death, to alleviate any chance of premature garbage collection.

It is a still further object of the present invention to create a distributed garbage collection system and method in which dead objects are incrementally collected within finite time, including cyclic distributed garbage, and living objects are not collected.

It is a still further object of the present invention to create a distributed garbage collection system and method which is independent of local activity (such as local garbage collection) such that any host computer may start such an activity at any time without need for synchronization with other host computers in a network.

It is a still further object of the present invention to create a system and method for distributed garbage collection in which a host computer in a network can always collect its local garbage such that during the period in which remote host computers in the network are down (or just inaccessible) only the collection of distributed garbage is blocked temporarily.

According to the present invention a method for garbage collection in a computer network system, and a device for achieving the method, has been developed. The system and method can be utilized in any system which can be described as a directed graph with nodes having a particular status. In one aspect of the present invention, timestamps are utilized such that graphs of referring objects, which change in time because of new references, are created, or because of a root of a graph moving from one computer to another computer, are correctly handled. Accordingly, in a further preferred embodiment of the present invention, the system and method can be utilized to reclaim space in a memory which is found to be occupied by "dead objects" in any system which can be described as a directed graph with nodes, and particularly in an object-oriented system such as a distributed Smalltalk system.

According to a first embodiment of the present invention, a first method is utilized. It includes a method of garbage collecting inaccessible information to reclaim memory space previously occupied in a memory of a logically organized computer network system including an assembly of groups of related entities, each of the groups being represented by a digraph without subcycles and each of the entities being represented by a node of the digraph, by distributing status information regarding the nodes of the digraph, in which a unique identifier with a value is associated with each node which does not have a particular status per digraph, each element of a set of variables associated with each node representing a variable which is coupled separately to an immediate predecessor of each node, the method comprises the steps of:

(a) assigning the value of the identifier of a node having a particular status to each variable coupled to the node;

(b) assigning the value of the identifier of a node without a particular status to each variable which is coupled to the node if the identifier satisfies a predetermined comparison criterion with respect to the variables of the set associated with the node;

(c) assigning the value of a variable of the set associated with a node to each variable which is coupled to the node, if all the variables of the set associated with the node are identical and the identifier of the node does not satisfy the predetermined comparison criterion of step (b); and (d) removing each variable which is coupled to the node if, in the set associated with the node, each variable is equal to the value of the identifier of the node or the set associated with the node is empty to thereby remove information from memory which has been determined to be inaccessible.

Particular circumstances occur if the variable is defined so as to include a row in which none, one, or more identifiers of nodes occur. In such circumstances, according to the invention, a second method of a second preferred embodiment is utilized. It includes a method of removing information, corresponding to inaccessible data, from memory of a logically organized system of groups of related entities, each of the groups being represented by a digraph and each of the entities being represented by a node of the digraph, by distributing status information regarding the nodes of each digraph, an identifier, of a unique value, being associated with each node, per digraph, and a set of elements being associated with each node not having a particular status, each element of the set representing a variable which is coupled separately to an immediate predecessor of the node, the variables including a sequential row of identifiers of nodes, the method comprising the steps of:

(a) assigning, for each node having a particular status, the value of the identifier of the node to each variable which is coupled to the node;

(b) performing a series of steps for each node which does not have a particular status, on the basis of the variables associated with the node, the series of steps including, (1) removing each variable associated with the node, in which another variable associated with the node is a prefix of the variable to be removed, provided the other variable includes an identifying mark;

(2) determining a reference value by selecting a variable which is a lexicographic maximum of all variables associated with the node, and removing, from the selected variable, all identifiers in the row, including an identifying mark if present, which satisfy a comparison criterion between each of the identifier of the row of the selected variable and the identifier of the node, (3) deriving a result value from the remaining variables associated with the node and the determined reference value, (4) assigning the result value to each variable coupled to the node, and (5) removing the node from memory of the logically organized system as information corresponding to inaccessible data, if the result value contains a row of only one identifier and an identifying mark, the node thereby obtaining certainty of status in relation to the digraph.

This second method is excellently suited for use in a system in which digraphs having subcycles occur.

In another preferred embodiment of the present invention, the variables of a set associated with a node are copied to form a replica set, after which the steps, to be carried out per node not having a particular status, are carried out on the replica set. As a result of this it is possible that, while carrying out the method on a node, new values can be assigned to the variables by nodes which are coupled to these variables, because the steps are carried out on the copies of the variables in the replica set.

In a further preferred embodiment, a method may also be used in cases where nodes with or without a particular status are added dynamically to, or are removed dynamically from, a digraph. By such a method the method additionally comprises the following steps: associating a timestamp with a node at an instant where
    coupling is created with the node; and
changing the timestamp of a node such that a result
    value is obtained which is larger than a previously
    obtained result value in the case of an empty result
    value being previously received from an immediate
    predecessor node.

These and other objects of the invention will become more readily apparent from the understanding of the preferred embodiments described below with reference to the following drawing figures.

The invention will become more fully understood from the detailed description herein below with reference to the accompanying figures, given by way of illustration only and not intended to limit the present invention in which.

In these figures, like reference numerals refer to the same components.

DETAILED DESCRIPTION OF THE PRESENT INVENTION

Terminology will be utilized through the detailed description of the present invention which is the same as that previously discussed in the background of the invention. Such like terminology carries the same meaning as previously utilized in the background of the invention, unless otherwise specified.

Figure 1:
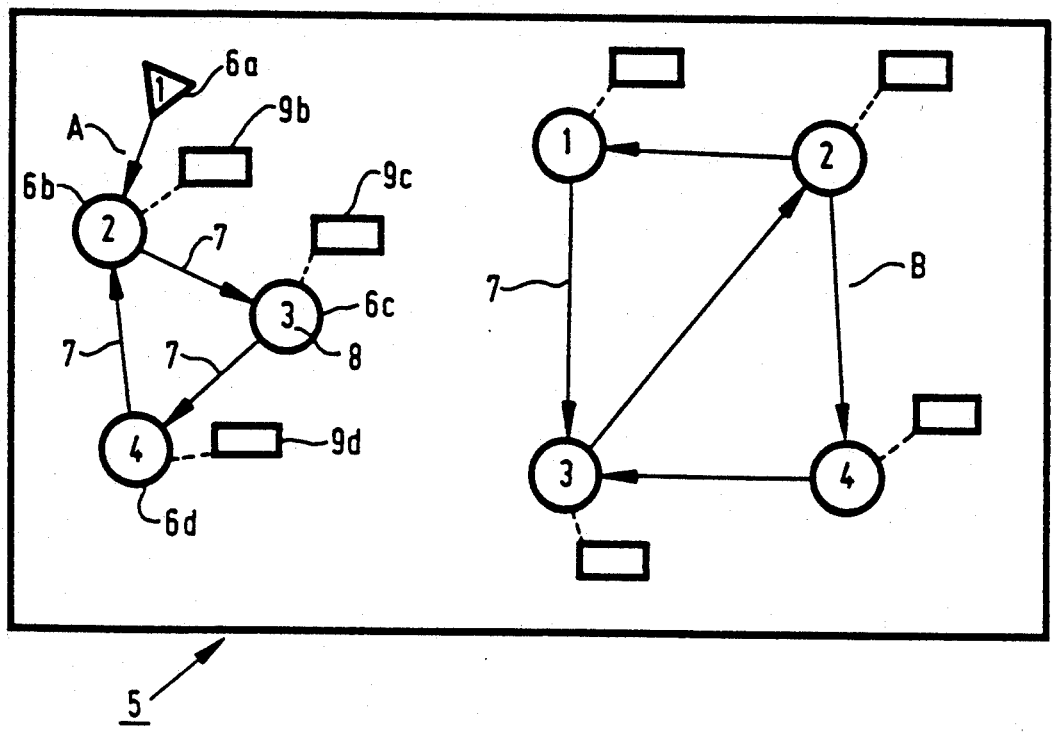
FIG. 1 shows a logically organized system, in which two groups of logical components occur, each group being represented by a digraph.

FIG. 1 shows a logically organized system 5. A method according to a first and second preferred embodiment of the present invention will be described in greater detail with reference to the logically organized system. It should be noted, however, that the various methods of the preferred embodiments of the present invention can be utilized on any system which can be described as a directed graph containing nodes of particular status. Accordingly, although the methods in the system of the preferred embodiments of the present invention are directed to methods for garbage collection in a computer network system, one specific aspect of the present invention may be directed to a garbage collection method in an object-oriented systems, such as a distributed Smalltalk system. However, it should be noted that the present invention is clearly not restricted and thus in any way limited to object-oriented systems. The present invention, for example, could be utilized in a distributed document management system, programmed in C, and running on a number of interconnected personal computers.

In one preferred embodiment of the present invention it is discussed that the invention can be utilized in an object-oriented system. In relating the overall method for garbage collection in a computer network system, of any system which can be described by a digraph containing nodes of a particular status, and that of an object-oriented system, certain parallels exist. In describing a method which is applicable to any system which can be described as a directed graphed with nodes of a particular status, terminology such as node, directed edge, node with a particular status and digraph, parallel the terms of an object-oriented system utilizing the terms object, reference from one object to another, root, and group of objects connected by reference, respectively.

Each of the methods of the present invention are applicable to any logically organized systems for collecting garbage or reclaiming memory space occupied by nodes, or objects, which are no longer accessible (one in which a directed edge cannot be traced from a node with a particular status to this node. For example, two or more work stations, such as a SUN computers, can be connected together and utilizing a distributed Smalltalk system as previously described, can utilize the methods of garbage collection of the present invention. It should be apparent from previous discussion in the background of the present invention that the aspects of garbage collection involve the freeing up of memory space by reclaiming memory space previously occupied, that is now occupied by inaccessible information. Accordingly, in any type of computer networking system which contains a plurality of computer units networked together via communication channels, such as modems and the like, and containing memory, it is possible to implement such system and method of the present invention. Further, with respect to garbage collection, all distributed computer systems for which the memories are organized as heaps have a need for such a system and methods of the present invention. For the sake of brevity, the actual structuring of a computer network system, or any type of similar logically organized system utilizable via the methods of the present invention, will not be described. It should be understood, however, that where the terminology of computer units is utilized, any type of computer including a keyboard, a display, along with internal circuitry such as a central processing unit (CPU) as well as various read only and random access memories, can be substituted. It should be understood that it is the central processing unit in combination with other elements of each computer unit which performs the various methods of the present invention in connection with the memory units, storing the various method of the preferred embodiments of the present invention, for example, of the various computer units, to thereby garbage collect inaccessible information and thus free up existing memory space. Garbage collection between each of the computer units can be achieved via modems and communication channels connecting the computer units, the details of which are not included for the sake of brevity. Further, the utilization of various entrance tables and timestamps are created through utilization of the CPU in each of the computer units and the tables and timestamps are stored in memory of each of the computer units.

In one preferred embodiment, as previously described, the system and methods for garbage collection of the present invention can be utilized in an object-oriented system such as a distributed Smalltalk system. Smalltalk can be best considered to be a programming language for a computer. Therefore, programs can be written in Smalltalk and can later be utilized. Such a language is similar to that of BASIC or PASCAL on a personal computer. So if suppliers write, for example, spread sheet program in BASIC or PASCAL and the person who is the customer can buy or write and use this program for their own purposes. With programming language, one can write all kinds of programs and Smalltalk exists as such a language. Smalltalk is well suited to write programs for office automation like data bases, calendaring systems, spread sheets, etc. Distributed Smalltalk goes beyond basic Smalltalk in that it is very well suited to write programs that support people working in groups together on a number of network computers. Such a program can be utilized in distributed data bases, distributed calendaring systems, distributed document management systems, multi-authoring systems, electronic mail, etc. Accordingly, areas of specific implementation of the present invention have thus been given.

FIG. 1 shows a logically organized system 5. Both a first and the second preferred embodiment according to the invention will be described in greater detail with reference to the logically organized system. Subsequently both preferred embodiments will also be applied to an object-oriented system.

The logically organized system 5 of FIG. 1 comprises two groups A and B (A being the leftmost group of nodes 1-4 in FIG. 1 and B being the right-most) of logic components, each group being represented by a digraph. The digraph includes a plurality of nodes (6a, 6b, . . . ) connected by directed edges 7. Moreover, in digraph A the node 6a is designated having a particular status. Throughout the specification, each node shown by a triangle equals a node with a particular status and each node shown by a circle equals a node not having a particular status. Each node further includes an identifier 8 which is shown within the node representation (circle, triangle).

It should be recognized by those of ordinary skill in the art that the illustrated logically organized system of FIG. 1 has been drafted on a representational bases for clear illustration of operation of the system and methods of the present invention, regarding each of the preferred embodiments. As has been previously explained, the systems and methods of the present invention are applicable to any logically organized system which can be represented by a digraph, such as a distributed Smalltalk object-based system utilizing a network of Virtual Machines, for example. Accordingly, in such an object-based system, any and all information pertaining to the system is an object and thus each object is stored in a block of memory. When objects are created, a new block of memory is utilized. These blocks of memory are accessed via object pointers, which are indirect pointers accessible via a table.

Thus, similarly, nodes also represent any and all information of any logic organized system which can be represented by a digraph, not just an object oriented system. These nodes are accessed via a plurality of directed edges. All nodes are traced and marked back to a node with a particular status (analogous to a "root" previously discussed with regard to object oriented systems). Accordingly, as objects relating to data remaining accessible via a path of pointers starting from a root are alive, so too are nodes similarly traceable to a node of a particular status. Accordingly, "dead" nodes, as are "dead" objects, are garbage collected and thus terminated to thereby free memory space previously occupied. These processes will be defined hereinafter in greater detail.

A set of variables (Pn) having reference numerals 9b, and 9c and 9d, respectively, is associated with the nodes (6b, 6c, 6d) which do not have a particular status, 'n' referring to the identifier of the node in question. Accordingly, the set of variables P3 {α2} is the set of variables associated with node 3 (α, being a variable) and coupled to node 2. Each node can at any instant transmit a result value to a subsequent node in the digraph, the value being assigned to the variable which is coupled separately to the transmitting node and which is element of the set associated with the receiving node. This process will be subsequently described.

As has been previously described, Pn is the set of variables associated with the node "n". A variable, as will be subsequently described, is defined as a sequence, or row, of sequential identifiers and can further include an identification mark. Further, each identifier has a value.

As is illustrated by FIG. 1, 9b represents the set of variables P2 associated with node 2. Each set contains zero, one, or more variables. Variables can be assigned values by a predecessor node. Accordingly, node 3 has a set of variables, P3 {α2}. The variable α2 is coupled to node 2 and associated with node 3. Node 2 is the predecessor node of the node 3 and, as a consequence, node 2 is able to assign a value to the variable α2.

Thus, the one variable in the set P3 is associated with the node 3 and coupled to node 2. Resultant values are transmitted and assigned to variables from predecessor nodes via the directed edges 7, as shown in FIG. 1. The result value is determined by a method which will be described with reference to this system and according to which it is possible to find out from the determined result value whether a node having a particular status is or is not present in a digraph.

The starting point in this method is based on the system functionality that the node having a particular status (6a) will assign its identifier, having value 1, to the variable, coupled to said node, of the set P2 referred to by reference numeral 9b and associated with node 6b. This further presupposes that the set P3, referred to by reference numeral 9c and associated with node 6c, includes a variable $\alpha$ of an identifier of value 2 derived from the identifier of the immediate predecessor node 6b. This will be referred to hereinafter as P3{2}.

The process by which node 6c (the predecessor node) can transmit a result value according to the first preferred embodiment of the present invention, to a node to be indicated as a successor will now be described with reference to the method illustrated in a flow diagram of FIG. 2. The starting situation is denoted by 10. In step 11 it is tested whether the condition is satisfied that all variables from Pn are equal to n, or whether Pn is an empty set ($\epsilon$). If any of these conditions is satisfied, the value "nil" is computed in step 12 and is assigned to all variables coupled to this node (n). If all the variables of a set have the value nil, then this set is by definition an empty set. Accordingly, in step 18, a final state is reached, the node (n) is terminated, and thus memory space previously occupied is freed. In the example shown in FIG. 1, with regard to group A, one of these two conditions has not been satisfied. In a subsequent step 13, upon the condition of step 11 not being satisfied, the condition is tested whether all the variables from P3 are less in value than the value of the identifier of the node, i.e. 3. Since it holds that P3=P3{2}, and 2<3, this condition has been satisfied. As a result of this, the result value in step 14 obtains the value of the identifier of the present node (n) and the value is assigned to the variables coupled to the present node (n). This implies that in P4 the value 3 is assigned to the variable coupled to node 3 (6c in FIG. 1). The pseudo-final state 17 is then reached. The program then is in a quiescent phase until an external signal is given to again carry out the described steps from step 10 for node 3.

The same method is now used to determine a value for the node with identifier 4 (6d in FIG. 1). It holds that: P4{3}. Thus the variable of the set associated with node 4 receives the value of the identifier of node 3, its predecessor node. The use of the described method shows that the condition in step 11 is not satisfied, but that the condition in step 13 has indeed been satisfied, 3<4. So in step 14 the value 4 will be assigned to the variables coupled to node 4. The value 1 and 4 will thus be assigned to the variables associated with node 2 (a 1 from node 1 and a 4 from node 4). P2{1,4} will now hold for P2.

If the described method is subsequently applied to node 2, none of the conditions described in step 11 or 13 is satisfied. It is then tested in step 15 whether all the elements or variables from P2 are identical in value and exceed 2, the value of the identifier of the node. This is not the case.

If the condition of step 15 was satisfied, however, the process would proceed to step 16. At step 16 the identical value, the value of each of the variables of Pn, would then be assigned to all the variables coupled to node n. The process would then proceed to step 17 where a pseudo final state exists. Since this condition is not satisfied, however, node 2 then reaches the pseudo-final state 17 without anything being transmitted to a successor. In the present example this means that the situation in A has reached a stationary state and thus all data is relevant and no "garbage" need be collected.

Now the case will be considered in which the node with the identifier value 1 is removed. P2 then becomes P2{4}. At the instant the method is carried into effect on the set P2, the stationary state is broken. P2{4} now satisfies the condition set out in step 15, namely that all the variables from P2 are identical in value and the value of the identifier of the node 2 is less in value than the identical value of the variables from P2, i.e. 4>2. Thus, the value 4 will be assigned to the variable of the set P3 coupled to node 2. As a result of this P3 becomes P3{4}. If, in this situation, the method is carried out on the set of variables of the node with identifier 3, then the result is that the value 4 is also assigned to the variable from P4 coupled to node 3, for reasons previously described. As a result of this P4 becomes P4{4}. If, in this situation the method is carried out on the node with identifier value 4, then the condition set out in step 11 is satisfied, namely 4=4. The value "nil" is then assigned to the variable coupled to node 4 and this variable is then removed from P2 via step 12 and step 18. When applying the method to mode 2, the condition of step 11 will also be satisfied and the variable coupled to node 2 will be removed from P3. Now the condition set out in step 11 also holds for node 3. Herewith the object of the method has been reached, namely the distribution of global status information of the digraph. This means that the information concerning the absence of the node with particular status, between the nodes of the digraph, has been globally transmitted. The final state is reached after step 12, in step 18, and thus garbage is collected to free previously occupied memory space.

This information may be used, for example, for garbage collection, by removing, in step 18 via step 12, the node to which the method was applied to thereby free previously occupied memory space. When applying the method to digraph B it may be seen that in node 3 propagation along the graph is halted in spite of the absence of a root, because the two result values transmitted to node 3 will be different in value. Broadly speaking it holds that the first method of the first preferred embodiment of the present invention is not suitable if there are subcycles, such as that occurring between nodes 1, 3, 2 which is a subcycle of the cycle 2, 4, 3. This is because the propagation is stopped at a node with several incoming edges and consequently no contribution to the method is provided any longer via this path.

The second method of another preferred embodiment of the present invention will now be described, still with reference to the logically organized system of FIG. 1. However, this method does not exhibit the previously mentioned limitation described herein before and consequently is effective in the case of subcycles. This will be done with reference to the flow diagram of FIG. 3. According to this method a variable includes a row of zero or more sequentially arranged values of identifiers of nodes, and can possibly include an identification mark. As a starting-point the situation of the variables of the sets P associated with the nodes having, as a value, the value of the identifier of the predecessor node coupled to the variable. A root or node with a particular status, is not present.

Let it be assumed that the method is initiated at node 3 of group B. Starting from the initial situation in step 30, the variables are copied from the set P3 associated with node 3, to the replica set P'3 in step 31. P'3 then has 1 and 4 values of its elements or variables, to be referred to hereinafter as P'3{1, 4}. P'3 is the replica set to which the subsequent steps of the method of FIG. 3 are applied.

Figure 3:
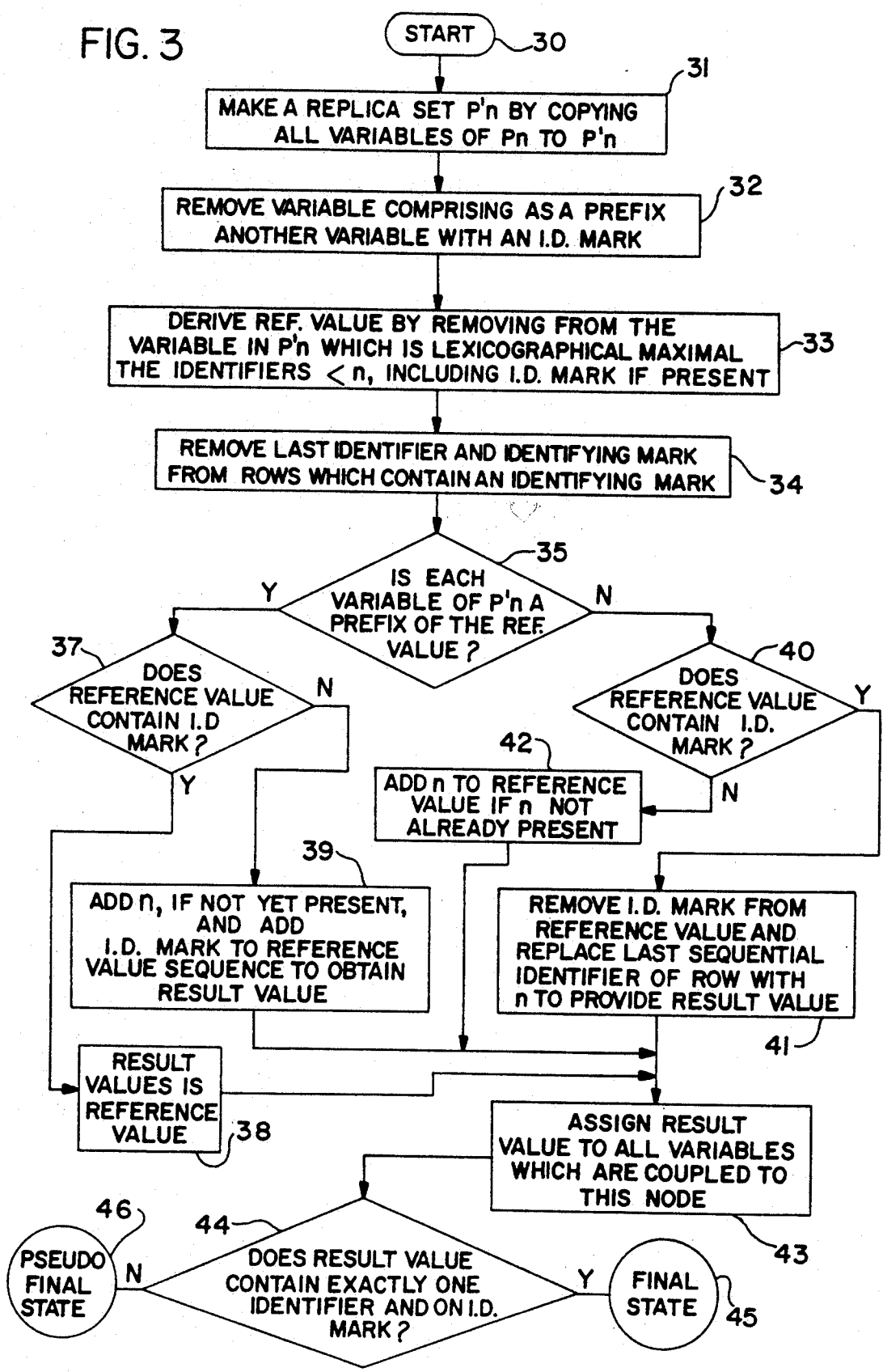
FIG. 3 is a flow diagram of another method according to the present invention which may be applied to nodes not having a particular status.

The replica-set is not strictly necessary for the working of the method shown in FIG. 3. However, the original set P3 contains the "original" variables, which asynchronously will be changed in value by the nodes to which these variables are coupled. Therefore, by making copies of the variables of a given value in a replica-set, the method of FIG. 3 can be operating on these copies for subsequent transmission of values to variables coupled to the node associated with the replica-set. Therefore, the replica-set acts as a kind of a buffer for intermediate results.

Thus, the objective of the replica-set is that the predecessor node can continually assign values to its coupled variables, without disturbing execution of the method. The new values of the variables will then be used a next time that the method is executed. The immediate predecessors of node 3 can still transmit result values to node 3 while the method is being carried out and alter P3 therewith.

In step 32 it is found out whether variables are present in the replica set which, as a prefix, include another variable which comprises an identifying mark. Predecessor nodes asynchronously assign result value to all variables which are coupled to these predecessor nodes. For a certain node "n", these values of variables are stored in the set "Pn". After copying these variables in the replica set in step 31, in step 32 it is determined whether or not there is a variable in the set which is a prefix of the value of another variable in the set and has an identification (identifying) mark (ID mark). If such a variable exists, then the variable which is a prefix, with the ID mark, is removed. It should first be noted that an ID mark is a mark assigned to a variable, along with its value, in a subsequent step of the flow diagram of FIG. 3. Such a mark is denoted by "*" in tables throughout the specification. An exemplary definition of "prefix" will now be described.

As previously stated, a variable value includes a sequential row (sequence) of values of identifiers including zero or more values in a row. Accordingly, this sequential row is the value of a variable in a set. Thus, a row may be a string of values such as a-b-c-d, representing a single variable (letters are merely utilized for representational purposes and thus can represent numerical values).

Accordingly, a set may contain a plurality of variables, each with its own row of values of identifiers, i.e. a-b-c-d, a-b. The variable a-b is thus determined to be a prefix of the variable a-b-c-d. A prefix includes one or more values of the sequence of the values of the other variable, sequentially determined from the beginning of the variable. Accordinly, since a-b contains the firs two values of the variable a-b-c-d, it is a prefix. However, the variable b-c-d would not be a prefix since it does not contain the first or initial sequential value of the other variable and only subsequently sequential values. Accordingly, prefixes of a-b-c-d would be a variable with the value "nil" (or empty), a, a-b, a-b-c, or a-b-c-d.

Further, with regard to step 32, the variable must not only be a prefix of the other variable, but must be a prefix with an ID mark, to be removed. Thus, while a-b is a prefix of a-b-c-d, it does not contain an ID mark and thus won't be removed. However, a-b* would be removed, it being a prefix of a-b-c-d with an ID mark ("*"). If this is the case the variables occurring with such a prefix and ID mark are removed.

Here, this is not the case so P'3 remains unaltered and the method progresses to step 33. The reference value of the present node 3 is then determined in step 33. For this purpose, first the lexicographic maximum of P'3 is determined, which results in the value pmax=4. This will subsequently be described in detail.

At step 33, a reference value is derived. This reference value is derived by removing all the identifiers with a value less than that of the value of the identifier of the present node ("n or, in this case 3), including an ID mark if present, from the variable in the set P'n which is determined to have the lexicographical maximal value. This concept of lexicographical maximal value or lexicographic maximum will subsequently be described.

Lexicographic order is relevant for rows or sequences of values which have some order (such as a dictionary). An example of lexicographic order is $Z>Y>X . . . >C>B>A$, each letter representing one variable. Thus, Z is the lexicographic maximum. Further, as a sequence or row of values exists for a variable, comparison is initially made between the first (or initial) sequential values or elements of the row. Upon their being equal, the next sequential values are compared with the lexicographic maximum containing a row of the first sequential and the higher of the two next sequential values of the variables. Such comparisons continue throughout the sequence of values until a lexicographic maximum is determined. An example will subsequently be described.

Number strings (rows) such as 10-9, 257-3, and 4 exist as variables, for example. The lexicographic order is $4<10-9<257-3$, achieved by comparing only the first sequential value of each variable, to yield the variable 257-3 as the lexicographic maximum. Further, with variables of rows 2-5, 2-6, and 2; 2-6 is determined to be the lexicographic maximum based upon comparison of the second sequential values of each row. Still further, a value with an identification mark is determined to be greater than an equal value without an identification mark for the purposes of determining which is lexicographically maximal. Thus a*>a and a* is the lexicographic maximum. The lexicographic maximum value is labeled pmax.

In step 33, upon determining the lexicographic maximum value, the reference value is then derived by removing the values of the identifiers which are less than the value of the identifier of the node ("n"), from the variable of P'n determined to be the lexicographic maximum. Further, ID marks are removed if present. Thus, if the variable 4-3-2* is determined to be the lexicographic maximum variable and the value of the identifier of the node "n" is equal to 3, then all values of the lexicographic maximum variable which are less than 3 are removed, including any ID mark. Accordingly, 2* is removed leaving 4-3. Therefore, 4-3 is the reference value. It should be noted that determination of values of the lexicographic maximal value being less than the value of the identifier of the node "n" are made on an individual (not sequential) basis to determine if each value of the lexicographic maximal variable is less than the value of the node "n".

In the present case, all values of identifiers which are less than the value of the identifier of the present node are then removed herefrom. Thus the value 4>3 and no values are removed. This provides a reference value 4, hereinafter referred as Ref=4.

In step 34, all the variables of P'n which include an identifying mark are removed in step 34. These are not present in P'3, so that P'3 remains unaltered. In step 35 a determination is made to determine whether or not each, and all variables of P'n is a prefix of the reference value determined in step 33. This is not the case here, so that the method progresses to step 40. In step 40, the reference value is checked to see if it contains an identifying mark. If it is found to contain an ID mark, the mark will be removed in step 41 and at the same time the last sequential identifier value of the reference value is replaced by the identifier value of the present node. This creates a result value. If the reference value does not contain an identifying mark as determined in step 40, the identifier value of the present node is added to the reference value, if this was not already present there, to determine the result value. This identifier value of the node is sequentially added to the reference value row, thereby being the last sequential value in the row in step 42. This provides 4-3 as a result value. The hyphen in the notation 4-3 separates the identifiers in the row. In step 43, once a result value is determined via steps 41 and 42, this result value is assigned to all variables coupled to the node 3 (thus variables in set P2 for node 3). It is then determined, in step 44, whether the result value contains exactly one identifier including an identifying mark. Since this is not the case, in this example, the program will reach the pseudo-final state in step 46. From this state the method must be carried out such a number of times until the definitive final state 45 is reached. Once a given node has reached the definitive final state, the method is no longer carried out with reference to this node and thus this node is terminated to thereby free previously occupied memory space.

If, in step 35, it is determined that each variable of P'n is a prefix of the reference value, the method then proceeds to step 37. At step 37 it is determined whether or not the reference value contains an ID mark. If the reference value contains an ID mark the method then progresses to step 38. In step 38 the reference value is assigned as the result value and the method proceeds to step 43 and subsequently to steps 44-46 as previously mentioned.

However, if in step 37, it is determined that the reference value does not contain an ID mark, the method progresses to step 39. In step 39, if the value of the identifier of the node "n" is not yet sequentially last in the reference value row, the value of the identifier of the node is added, sequentially at the end of the row of the reference value with an ID mark to thereby obtain a result value. If the value is already present, the result value is equal to the reference value, plus an ID mark added. The method then proceeds to step 43 and subsequently to steps 44-46 as previously mentioned.

Let it then be assumed that the method is going to be carried out for node 2 of group B of FIG. 1. With respect to node 2 it holds that: P2{4-3}. In step 31 the replica set is made: P'2{4-3}. In step 32 those variables are removed which comprise, as a prefix, another variable with identifying mark. Since these are not present, P'2 remains unaltered. The reference value is determined in the next step 33. For this purpose, the lexicographic maximum of P'2 is first determined, which yields: pmax=4-3. The reference value is then derived herefrom by removing all the identifiers which are smaller in value than the value of the identifier of the present node. As a result of this the reference value obtained is the value 4-3. The last identifier of all the variables with identifying mark, and also the identifying mark, are then removed in step 34. Since these are not present in P'2, said set remains unaltered. Then, in step 35 it is determined whether or not each variable of P'n is a prefix of the reference value. Since this is the case here, the method proceeds to step 37.

At step 37 it is determined whether or not the reference value contains an ID mark. Here, the reference value does not contain an ID mark and the method progresses to step 39. In step 39, with the reference value being determined as not having an identifying mark, the result value is determined by adding value of the identifier of the node sequentially behind the reference value in so far as not present, and also assigning an identifying mark. This yields a result value of 4-3-2*, where '*' denotes the identifying mark.

The method then proceeds to step 43 in which the obtained result value is transmitted to the nodes 1 and 4 and assigned to variables associated with nodes 1 and 4, those variables being coupled to node 2. In step 44 it is determined whether or not the result value consists of a row of only one identifier with an identifying mark. This is not the case so the pseudo-final state 46 is reached. With regard to the node in question the method is in the quiescent phase until an external signal is again given to carry out the described method from step 30.

TABLE 1

| step | node 3 | node 2 | node 1 | node 4 |
|---|---|---|---|---|
| 31 | P3'{ 1, 4 } | P2'{ 4-3 } | P1'{ 4-3-2* } | P4'{ 4-3-2*} |
| 32 | P3'{ 1, 4 } | P2'{ 4-3 } | P1'{ 4-3-2* } | P4'{ 4-3-2*} |
| 33 | Ref = 4 | Ref = 4-3 | Ref = 4-3-2* | Ref = 4 |
| 34 | P3'{ 1, 4 } | P2'{ 4-3 } | P1'{ 4-3 } | P4'{ 4-3 } |
| 35 | no | yes | yes | no |
| 37 | — | no | yes | — |
| 38 | — | — | Res=4-3-2* | — |
| 39 | — | Res=4-3-2* | — | — |
| 40 | no | — | — | no |
| 41 | — | — | — | — |
| 42 | Res=4-3 | — | — | Res=4 |
| 44 | no | no | no | no |
| 45 | — | — | — | — |

| step | node 3 | node 2 | node 4 | node 1 |
|---|---|---|---|---|
| 31 | P3'{ 4-3-2*, 4 } | P2'{ 4-3* } | P4'{ 4-3* } | P1'{ 4-3* } |
| 32 | P3'{ 4-3-2*, 4 } | P2'{ 4-3* } | P4'{ 4-3* } | P1'{ 4-3*} |
| 33 | Ref=4-3 | Ref=4-3* | Ref=4* | Ref=4-3* |
| 34 | P3'{ 4-3, 4} | P2'{ 4 } | P4'{ 4 } | P1'{ 4 } |
| 35 | yes | yes | yes | yes |
| 37 | no | yes | yes | yes |
| 38 | — | Res=4-3* | Res=4* | Res=4-3* |
| 39 | Res=4-3* | — | — | — |
| 40 | — | — | — | — |
| 41 | — | — | — | — |
| 42 | — | — | — | — |
| 44 | no | no | yes | no |
| 45 | — | — | terminated | — |

| step | node 3 | node 2 | node 1 |
|---|---|---|---|
| 31 | P3-{ 4-3*, 4*} | P2'{ 4* } | P1'{ 4* } |
| 32 | P3'{ 4* } | P2'{ 4* } | P1'{ 4* } |
| 33 | Ref=4* | Ref=4* | Ref=4* |
| 34 | P3'{ } | P2'{ } | P1'{ } |
| 35 | yes | yes | yes |
| 37 | yes | yes | yes |

TABLE 1-continued

| | | |
|---|---|---|
| 38 Res=4* | Res=4* | Res=4* |
| 39 — | — | — |
| 40 — | — | — |
| 41 — | — | — |
| 42 — | — | — |
| 44 yes | yes | yes |
| 45 terminated | terminated | terminated |

In Table 1 the intermediate results for the various nodes are recorded with a repetitive performance of the described method, until all the nodes have reached the definitive final condition in step 45. Herewith the object of the method has been reached, namely the distribution of global status information of the digraph. This means that the information concerning the absence of the node having a particular status, over the nodes of the digraph, has been globally transmitted, the digraph including a subcycle.

Upon reaching such a final state in step 45, the particular node in question is terminated or removed and thereby memory space previously occupied, is freed. This is true regarding garbage collection. Thereby, since the node no longer takes place in this aspect of the system, it is deleted from the entrance-graph (to be subsequently explained with regard to FIG. 4). However, the "thing" that was represented by this node could remain in existence to achieve some other purpose upon reaching this final state such as raising a flag, writing a message in a logfile, or filing an alarm.

Accordingly, pertaining to garbage collection, upon reaching a final state it can be determined that the graph, which comprises this node reaching step 45, certainly does not comprise a node with a particular status. This is the global status information concerning the graph, where this status information has now become pertinent to this node upon reaching step 45. Thus, at that moment, the method is ended for that node. In the case of garbage collection, the entry of an object, for example, in the entrance table (to be subsequently explained with regard to FIG. 4), is removed.

By reaching a final condition at step 45, distribution of global status information on the digraph is achieved. Thus, information is conveyed to the system that there does not exist a node on the digraph with particular status. Thus, that node, which at a certain moment can conclude this from its resultant value calculated, knows its digraph contains no nodes with a particular status and can thus take other actions, such as removing his entry from an entrance table.

It has been assumed, in the previously mentioned example shown in table 1, that the sequence in which the nodes perform the method is: 3, 2, 1, 4, 3, 2, 4, 1, 3, 2 and 1. The intermediate results of the method are recorded columnwise per node. The step numbers correspond to the numbers from the flow diagram of FIG. 3. The sequence in which the nodes perform the method may be arbitrary, however. Thus, table 1 is merely exemplary and should in no way be considered limiting. It follows from the above that the performance of the method can give rise to a new result value, and hence to the propagation of a change to the next nodes, only if the input values have changed.

In the next case it will be demonstrated that in the presence of a root or a node of particular status, the nodes do not reach the definitive final state 45. Let it be assumed that in FIG. 1 node 4 in digraph B is connected to a node (not shown in the Figure) of a particular status with a certain identifier, say 5. Repeated application of the method to the nodes of the digraph then leads to the result value 5-4 circulating in the digraph, whether or not provided with identifying mark. On the basis of step 33 the length of the result value will not be shortened, so that a notation characterized by an identifying mark (*) and including only one value of an identifier (X*) can never be formed for the result value, which is what is necessary to bring a node in the terminal phase.

Figure 4:
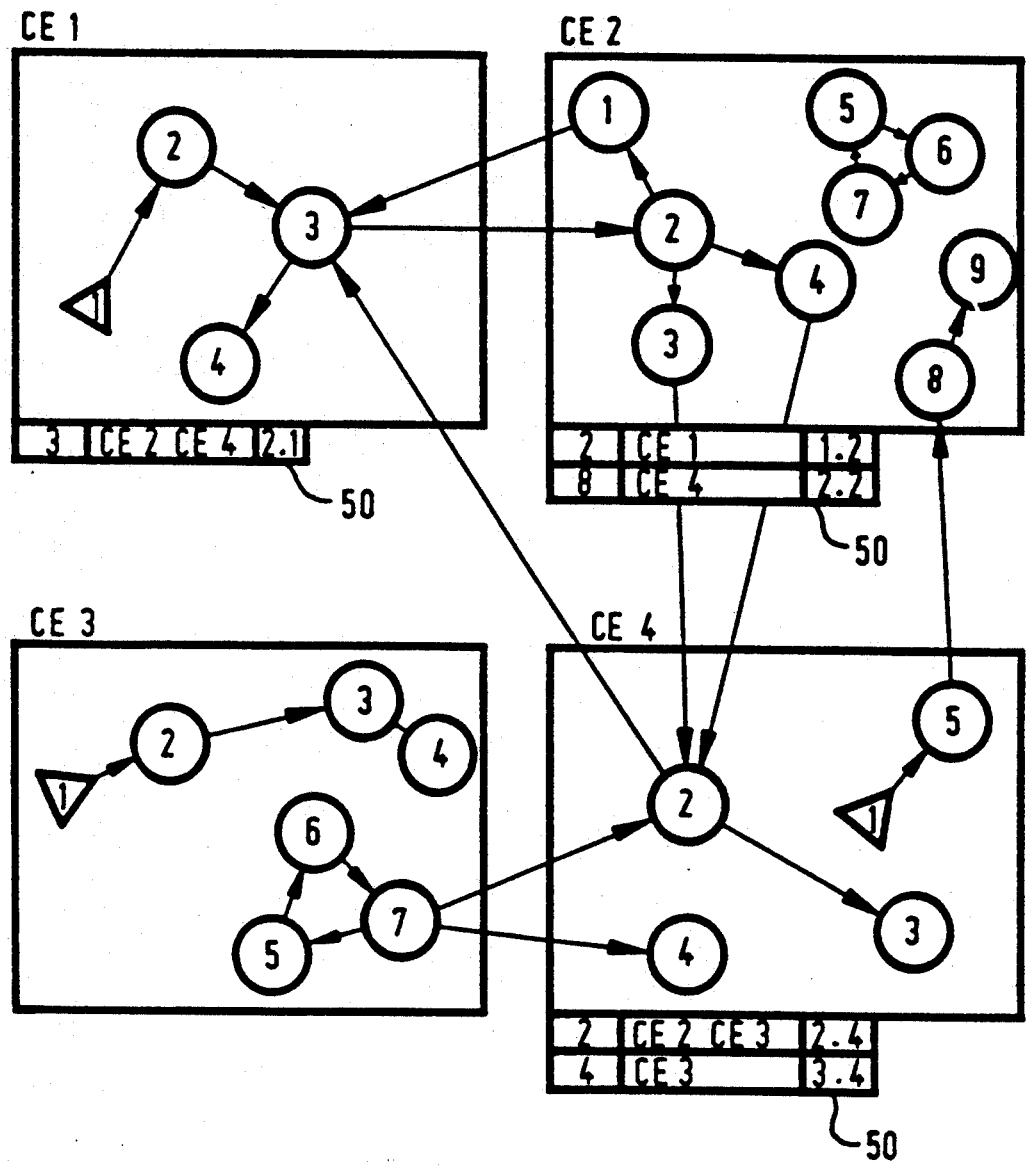
FIG. 4 shows a distributed object-oriented system comprising four groups, each group being shown as a digraph distributed over four computer-units.

As stated hereinbefore, both methods of the first and second preferred embodiments of the present invention will now be applied to an object-oriented system, for example, as shown in FIG. 4.

First of all the object-oriented system will be described in greater detail. In FIG. 4 the system is composed of four computer units (CE1, CE2, CE3 and CE4) coupled together via communication channels. It should be noted that each computer unit contains necessary internal structure such as a CPU, random access memory, and read only memory necessary to carry out the first and second methods of the present invention. Further each contains networking capabilities such as modems to transfer all the information between computer units on proper communication channels.

In such a system, objects are represented as nodes. References between objects are represented by arrows (pointers) between the nodes in question. Root objects are shown in the form of a triangle. Groups of objects which cohere together by means of references constitute a group. Only root objects can be accessed from outside the group. The other objects can be accessed only inside the group, namely by those objects by which they are referred. Objects are considered to be "living" if they have a root, i.e. if, starting from a root object, they can be reached via a path of objects referring to each other. A logically organized system thus described which is operative as explained hereinbefore may advantageously be provided with garbage collection functionality which has for its object to free memory space occupied by objects which are not to be considered as "living" and are hence to be considered as "dead" objects, since "dead" objects cannot be accessed at all and hence do not fulfil a function in the system any more.

In the embodiment of a logically organized system shown in FIG. 4, a list-like collection of objects is kept per computer unit in the memory part in question to which is referred by objects situated outside the computer unit. Such a list, which will hereinafter be referred to as an "entrance table", is shown diagrammatically on the lower side of each computer unit, and is referenced 50. Each object to which reference is made remotely, in other words an object to which is referred by an object situated on another computer, has an entry in the entrance table of the associated computer unit. This entry comprises the pointer to the object (i.e. the local identifier of the object) referred to and also the identifiers of the computer units in which objects reside, which refer to the present object. If applicable, a timestamp, which is assigned to the object in question, may also be incorporated in the entry. For example, the first entry of the entrance table 50 associated with computer unit CE4 (in casu: "2|CE2, CE3|2.4") indicates that there is a remotely referrd to oject (node 2 with, local identifier value of 2. It is referred to by objects which are present in CE2 and CE3. Further, with the entrance table it is noted that the timestamp 2.4 has been assigned to the object. In the second preferred embodiment previously described in relation to the flow diagram of FIG. 3, variables, the values of which are sent to successor nodes, include a row of values of node-identifiers. This row of sequential values allows for the method and system to handle subcycles. Such a system works well if a diagraph does not change over time.

To produce a system and method which is correct in any dynamic constantly changing situation, the value of node-identifiers are now characterized by timestamps. This means that at a certain moment the same node can receive a new node-identifier value. This occurs when a new reference to a node is created as will subsequently be described in relation to FIG. 6, step 63. Thus, the method and system of the present invention can further work correctly in dynamic situations where graphs are changing.

This node-identifier includes a timestamp for this method. Thus, the node or object will also have another local identifier, such as its object-pointer in Smalltalk. Further, the essence of timestamps is that when a node requests a timestamp, it receives a number higher in value than was earlier submitted by the "timestamp-submitter". A "timestamp-submitter", further, may act locally within on computer or computer unit. Thus, a synchronized clock is not necessary within the present invention, the computer-identifier being part of the timestamp. Utilization of timestamps in the present invention will be described later in greater detail.

It is possible to apply the methods of the preferred embodiments of the present invention to all objects within the same group referring to each other. However, more efficient methods for garbage collection can be found for a group of objects situated locally within a computer unit, since the methods to be used in such situations need not operate in a distributed and incremental manner. These are called local garbage collection methods. Therefore, a method consisting of a combination of a method with a local memory reclamation and the method according to the invention is to be preferred. In this connection it should be considered known to cause each computer unit to perform a local garbage collection at set intervals within the process of a distributed garbage collection, which can be realized in several manners.

In a known embodiment local garbage collection takes place by marking all the living objects which are found on systematically traversing references of all objects starting from a root object, and subsequently removing the nonmarked objects as dead objects and thus freeing up previously occupied memory space. In this manner local objects which have no roots are removed. Objects which occur in the entrance table and on the basis hereof have a root by definition are maintained. During traversing the graph it is also identified which objects refer to an object on another computer unit. These references, which are termed tuples, include the host identifier value and an index in the entrance table of the object referred to. They are passed on to the computer units on which the external objects are present. A computer unit will receive these references and use them to adapt its entrance table. Entries in the list of referring computer units of which are empty are removed. In fact, these objects do not have a root any longer and will consequently be removed in a subsequent local garbage collection action. The procedure described above works satisfactorily for acyclic groups. The procedure does not work satisfactorily if cycles occur in the group. If this is the case, one of the methods according to the invention is carried out in an adapted manner, as follows:

By distributed garbage collection, that is, garbage collection among several computer units within a network, according to the methods of the present invention, every computer unit has to determine result values of nodes within the computer unit which are involved in the distributed garbage collection. These values are calculated according to the method of the preferred embodiments of the present invention and are sent to successor nodes from the predecessor nodes. To determine which of a computers local nodes (i.e., the nodes within a computer unit) are involved in the distributed garbage collection, it must traverse graphs starting form a root-node. This must also be done for local garbage collection so it is handy to combine these methods.

Further, at a certain moment a node is removed from an entrance table (as a result of a distributed garbage collection action). From this moment on, the node no longer takes part in the process of distributed garbage collection. If the node was only reachable from an entrance table, then it is no longer reachable now. So, in a next local garbage collection action, it will be deleted and removed as a dead node.

One example of local garbage collection is that of nodes 5, 6, and 7 of computer unit 2 in FIG. 4. Each of these nodes 5, 6, and 7 are removed by the local garbage collection, performed solely by computer-unit 2, as they do not have a root.

Figure 5:
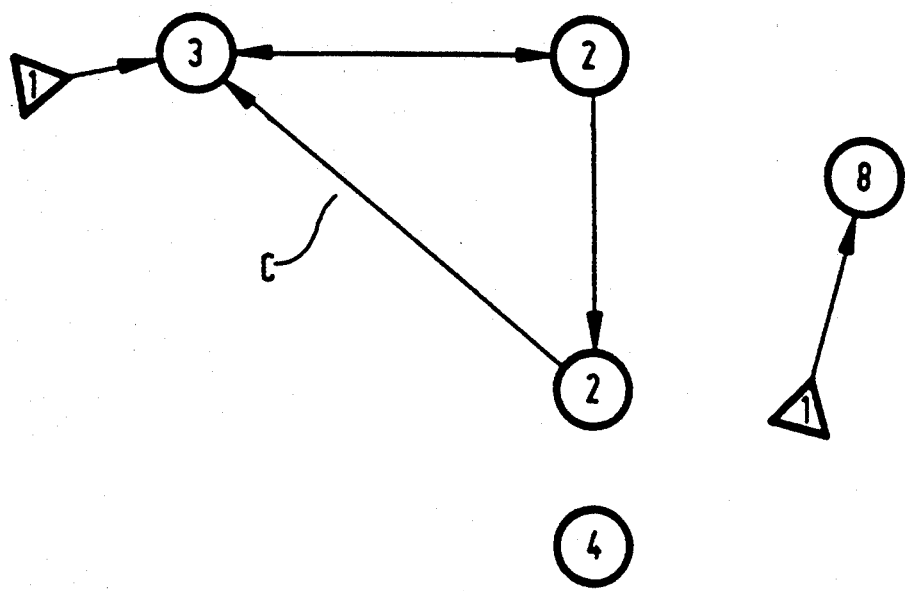
FIG. 5 shows entrance graphs derived from the distributed object-oriented system of FIG. 4.

During traversal of the objects which refer to each other, starting from a local root, it is also determined, for a local garbage collection, which objects refer to remote objects (remote objects being objects in another computer unit). For these remote objects a result value is determined according to one of the methods of the preferred embodiments of the present invention on the basis of the local root in the meaning of a result value-determining node. In addition, during traversal of the objects which refer to each other, starting each time from a single entry from the entrance table, it is also determined which objects refer to another remote object. For these remote objects a result value is determined on the basis of the data (entered result values, identifier) associated with the node of the entry. The result value is determined according to one of the of the methods of the preferred embodiments of the present invention. The nodes which are involved in the exchange of result values in the above-described manner constitute a directed graph, in which an edge in principle indicates the path or route along which transmission of a result value takes place. A graph defined in this manner will hereinafter be referred to as "entrance graph". Several entrance graphs may occur per distributed system. FIG. 5 illustrates the entrance graphs which can be constructed from the distributed object-oriented system of FIG. 4.

An entrance-graph is a graph which contains those nodes which are listed in the entrance tables of interconnected computer units. These nodes are connected via a path of references from one node to another whereby such a path is represented by a directed edge in the entrance graph. Further, the roots which are part of a path to one or more of the previously mentioned nodes are also part of the entrance graph. In most instances there will be a number of entrance graphs in a system of interconnected computer units.

In traversing graphs for garbage collection one starts at a root. Nodes which are references from outside the computer unit should not be collected as garbage because there is the possibility that they are connected to a root outside the computer unit. Thus, to prevent this, nodes which are externally referenced get an entry in the entrance table and are "referenced" from the entrance table. By subsequently declaring that an entrance table is a root, all nodes which have an entry and all its successor nodes will, upon traversing the graph, be marked as living and will not be garbage collected. Therefore, it is not necessary to give a "real" root an entry in an entrance table because the root, in itself, is already a starting point for graph traversal.

In carrying out a methods according to the preferred embodiments of the present invention the following principle may advantageously be used to find out which result values must be computed.

"Should both a result value of a root and one or more result values of other objects have been determined for the same remote object, then it is only the result value of the root which is relevent". This implies that, should a remotely referred object be present on a path starting from a root, then the graph starting from the remotely referred object need not be traversed any longer. Nor is it necessary that result values are exchanged between nodes of an entrance graph situated within the same computer unit. The result values which have been determined during a garbage collection action performed on a computer unit are collected and transmitted packetwise to the other relevent computer units. A receiving computer unit ensures that the transmitted result values are incorporated in the relevant sets of the remotely referred nodes, which is done according to the principles as stated hereinbefore in carrying out the methods according to the preferred embodiments of the present invention. The result value determines whether or not certain objects, which are externally referred to are referred to in any manner by a root object in another computer unit. If the result values are composed according to the principles associated with the method according to the first preferred embodiment of the present invention, the determination has also been made when cycles occur in the chain of references. If the result values are composed according to the principles associated with the method according to the second preferred embodiment of the present invention, then the determination has also been made when subcycles occur in the chain or references.

Figure 6:
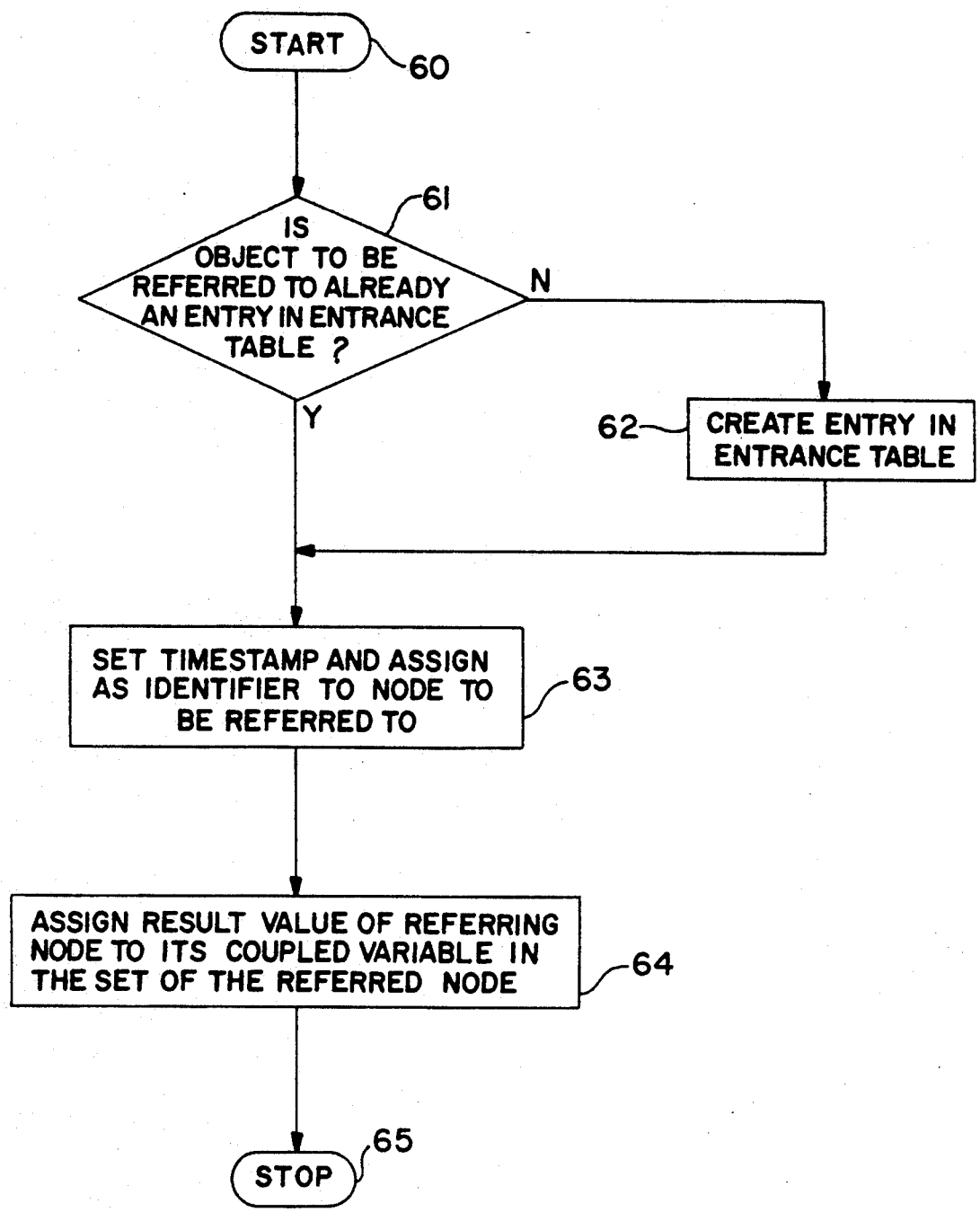
FIG. 6 is a flow diagram of a method of the present invention which relates to the receiving of a result value.

A method of distributed garbage collection will now be described in detail applied to entrance graph C in FIG. 5 which is based on the method of the second preferred embodiment of the present invention and in which timestamps are used. A timestamp is to be understood to mean herein a number to be increased or decreased stepwise (for example, the time value at the instant of putting), optionally succeeded by the identifier of the computer unit. Each time a reference is created, a timestamp is created and assigned as an identifier value to the node to be referred to for the method of the present invention. The steps shown in the flow diagram of FIG. 6 are followed to create such a timestamp.

The starting situation is denoted by reference numeral 60. In step 61 it is determined whether or not the object to be referred to already includes an entry in the entrance table. If this is not the case, an entry is created in step 62. The timestamp is set in step 63 and assigned as an identifier value to the node to be referred to. Further, if it is determined in step 61 that the object already has an entry in the entrance table, this step 63 is also carried out. Finally, the result value of the referring node is assigned in step 64 to its coupled variable the set of the referred node. At step 65 the procedure is complete. Table 2 shows a few objects with associated timestamps occurring for a number of computer units in the system of FIG. 4. By providing the timestamp with an identifier value including its relevant computer unit, the timestamps become globally unique in that no two timestamps are alike. It should be noted that, in this example, objects and nodes are equivalent.

In simple form, the timestamp includes a sequential number succeeded by the identifier of the computer unit. The sequential number is issued centrally on a computer unit and each time is increased stepwise, sequentially, when a timestamp is set for that computer unit.

TABLE 2

| Local identifier of the object | computer-unit in which the object is present | timestamp of the object |
|---|---|---|
| 1 (root) | 1 | 1.1 |
| 3 | 1 | 2.1 |
| 2 | 2 | 1.2 |
| 8 | 2 | 2.2 |
| 1 (root) | 4 | 1.4 |
| 2 | 4 | 2.4 |
| 4 | 4 | 3.4 |

The local identifier of each object which is also shown in Table 2 is used as an index in the entrance table associated with the computer unit. Also, the timestamp is placed in an entry of the entrance table. Table 3 shows a possible course of a distributed garbage collection action according to the methods of the second preferred embodiment of the present invention, applied to entrance graph C of FIG. 5. Each node or object is listed in Table 3 with its timestamp and computer unit.

For each node or object which is listed in Table 3 from left to right, which indicates the sequence in which the objects are related with a garbage collection action, the intermediate results are recorded in determining the result values to be transmitted. However, it should be noted that a root does not calculate its result value. Its result value is, by definition, its node identifier. Since each computer unit is free to start a garbage collection at any moment, another sequence might have taken place and other values for the result values to be exchanged would then be found. However, the effectiveness of the procedure with regard to garbage collection is not affected by this. Accordingly, the order of garbage collection is not a limiting feature of the present invention.

It has been assumed, in accordance with Table 3, that computer 1 begins a garbage collection. This means that all objects which have no connection to a root are removed. Referring to FIG. 4 this means that from the local root 1 and, as appears from the entry in the entrance table, from the remotely referred object 3, graphs will be traversed.

The graph traversing from root 1 marks the objects 2, 3 and 4 of computer unit 1 and signals a remote reference to CE2. Upon traversing the graph from object 3 of CE1, it becomes immediately obvious that from object 3 the remainder of the graph has already been examined when traversing the graph from root 1. Thus, this procedure need not be repeated. A result value is now determined which, together with a reference according to the method of the present invention as previously described with regard to FIG. 3

TABLE 3

| step | CE1 1.1 root | CE2 1.2 | CE4 2.4 | CE1 1.1 root |
|------|--------------|---------|---------|--------------|
| 31   | 1            | P'{ 1.1 } | P'{ 1.2 } |            |
| 32   | 1            | P'{ 1.1 } | P'{ 1.2 } |            |
| 33   | 1            | Ref = 0 | Ref = 0 |              |
| 34   | 1            | P'{ 1.1 } | P'{ 1.2 } |            |
| 35   | 1            | no      | no      |              |
| 37   | 1            | —       | —       |              |
| 38   | —            | —       | —       |              |
| 39   | —            | —       | —       |              |
| 40   | —            | no      | no      | —            |
| 41   | —            | —       | —       |              |
| 42   | Res=1.1      | Res=1.2 | Res=2.4 | Res=1.1      |
| 44   | —            | no      | no      | —            |
| 45   | —            | —       | —       |              |

By definition, a root transmits its own timestamp. Thus, this repeatedly transmitted timestamp continuously blocks further circulating of a lexicographical maximum result value in a graph. This presents the result value from reaching the node from which it originated and thus prevents garbage collection of nodes which can be traced to a root ("living" nodes or objects).

Figure 2:
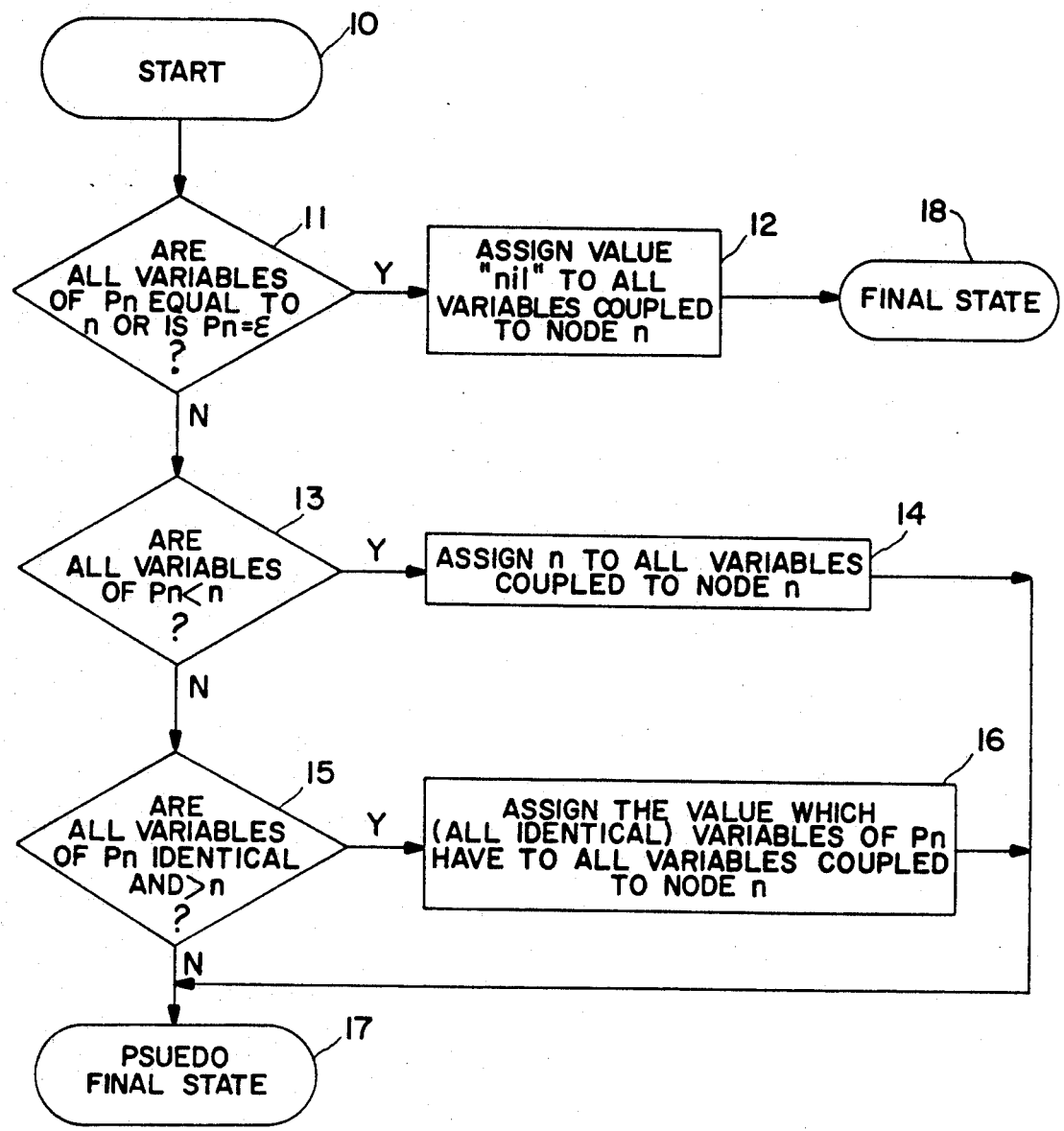
FIG. 2 is a flow diagram of a method according to the present invention which may be used for nodes not having a particular status.

As previously described, operations involving timestamps ocur by previously mentioned methods of the present invention, namely those referring to FIGS. 2 and 3. With timestamps, lexicographic order, for use in determining whether one timestamps is less or greater in value than the other and further for determining a lexicographic maximal value, is determined by first comparing the number preceding the decimal and then, if they are equal, comparing the numbers appearing after the decimal point. Thus $1.1 < 1.2 < 2.1 < \ldots < 3.4$.

Further, timestamps can be utilized as global-node-identifiers. A variable is a row of node-identifiers and can further contain an ID mark. These node-identifiers are now timestamps. Thus, one variable could be represented by 2.4-2.1-1.2*, the decimal point separating the portions of the timestamp and the dash (-) separating sequential identifier values in the row. Thus, instead of having a row of node-identifiers of numbers, or single values (with a lexicographic order), we now have a row of elements, each element itself having a lexicographic order. Thus, $2.4 < 2.4\text{-}2.1\text{-}1.2^*$ with 2.4-2.1-1.2* being the lexicographic maximum.

Further, when removing values less than the value of the node identifier (2.1 for example), the reference value achieved is 2.4-2.1.

Further, similar rules hold true regarding the determination of prefixes. For example, if in step 33 of FIG. 3 it is determined that the reference value=2.4-2.1 and in step 34 P' (2.4-2.1, 2.4), in step 35 it is determined whether or not each variable of P' is a prefix of the reference value. 2.4-2.1 is a prefix, as is 2.4, thus the condition of step 35 is satisfied. However, if 2.1 was a variable, the condition would not be satisfied.

It has been assumed that after computer unit 1 computer unit 2 then starts to perform a garbage collection. This involves the removal of dead objects. Referring to FIG. 4, this means that nodes 5, 6 and 7 are removed. Edges and nodes of the entrance graphs are also collected. For computer unit 2 these are the nodes 2 and 8. Since these nodes are remotely referred to, as appears from the entrance table, they also form the objects from which references will be further traversed to mark the living objects.

In other words, CE2 begins garbage collection by traversing the graphs starting from available roots and from nodes mentioned in the entrance table. In CE2 there are no roots, thus the system moves on. Starting from node 2, nodes 1, 4 and 3 are marked and remote signals are sent to CE1 and CE2. Starting from node 8, node 9 is marked. Subsequently, as part of local garbage collection, nodes 5, 6, 7 not marked, are removed as dead nodes to thereby free previously occupied memory space. The system is not allowed to remove node 9 at this time because it is referenced, via node 8, from an external computer unit. This reference has potential of originating from a root.

Upon traversing the graph from object 8, 9 is marked, so that this object remains existing. The traversing of the graph from node 2 leads, via node 1, to an remote reference on CE1 and via both nodes 3 and 4 to a remote reference on CE4. A result value is then determined on the basis of object 2 of CE2 which together, with a reference, and according to the method of FIG. 3 of the present invention is then transmitted to CE1 and CE2. Transmission of result values comprising a row of timestamp elements is termed a packetwise transmission. Thus, the receiving node receives, as a result value, a timestamp packet. The respective computer units then ensure that the result values, according to the principles of the method of the present invention previously described with regard to FIG. 3, are taken up in the sets associated with the relevant nodes.

It should be noted that the present invention example, utilizing timestamps, has been described by referring to the method of the present invention referred to in FIG. 3. However, this is because as can be seen regarding FIG. 4, the system of FIG. 4 contains subcycles and thus one of ordinary skill in the art would use the method previously described with regard to FIG. 3. However, as one of ordinary skill in the art would recognize, if no subcycles were present, the method as previously described in FIG. 2 could be utilized.

Figure 7:
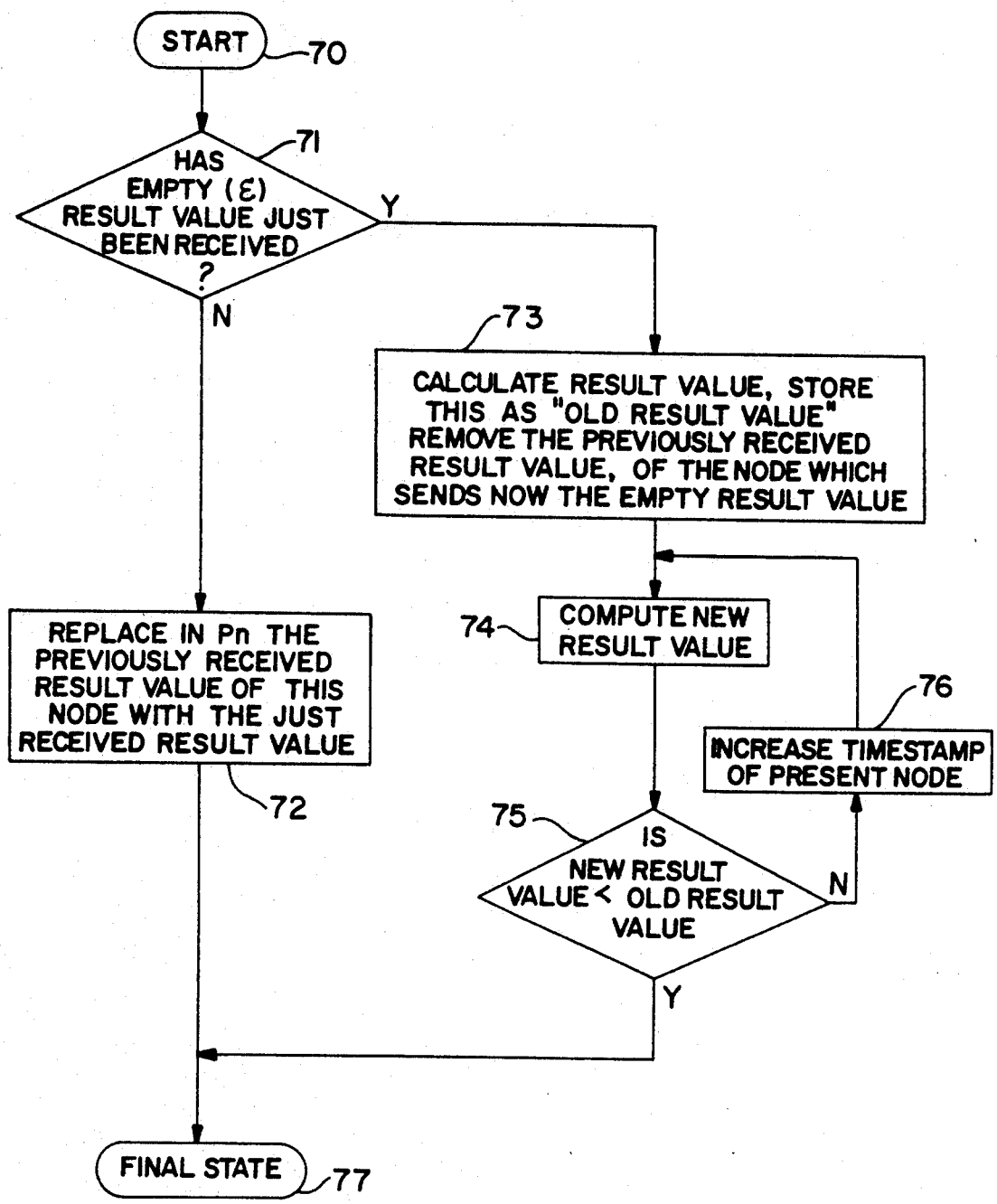
FIG. 7 is a flow diagram of a method of the present invention for creating a reference.

The steps which have to be performed when a result value is received by an object or node, are shown in the flow diagram of FIG. 7. The initial situation for such an object or node is denoted by 70. In step 71 it is determined whether or not an "empty" result value ($\epsilon$) has been received by the relevant object or node. This occurs if a result value of a transmitting node is lacking for the node in question for the first time, after, prior to this, a result value had been received from the transmitting node. If no empty result value is received from the transmitting node, then the previously received result value of this node is replaced by the newly or just received result value in step 72.

If on the contrary, an empty result value ($\epsilon$) is received as the result value which has just been received, the result value of the transmitting or referring node received at an earlier instant is removed in step 73 after the result value has been computed by the receiving node, based upon the old situation. In step 74 a new result value is then computed. In step 75 this new result value is compared with the result value based on the old situation. If the newly computed result value is less in value than the value of the result value based on the old situation, then the timestamp of the present node is increased in step 76 until the newly computed result value is larger in value than the old result value. As soon as this is established in step 75, the final state 77 is reached. The use of the steps of FIG. 7 will be explained hereinafter in an example.

It has been assumed that after the garbage collection action of computer unit 2, computer unit 4 then starts to perform such an action. Living objects are then marked, starting from root 1 and from the entries from the entrance table, i.e. nodes 2 and 4, by traversing the graphs starting therefrom. The graph starting from the local root 1 has an external reference to nodes 8 and 9 of CE2. For this, a result value is determined on the basis of the local root. The graph starting from node 2 provides a remote reference for CE1. The graph starting from node 4, however, provides no remote reference.

The result values and references obtained are then composed and transmitted packetwise to the relevant computer units. The result values transmitted on the basis of nodes 2 of CE4 and 1 of CE4 will be placed, after having been received, in the sets associated with nodes 3 of CE1 and 8 of CE2, respectively, in, accordance with the method.

Suppose that now CE1 starts a garbage collection action. Initially, root 1 sends the timestamp 1.1. This result value is assigned to node 2 of CE2 (identifier value of 1.2) based upon the rule previously stated in the present specification, namely: "should both a result value of a root and one or more result values of other objects been determined for the same remote object, then it is only the result value of the root which is relevant." This is the only incoming value for node 2 of CE2 (1.2).

Based upon the previously mentioned result value, node 2 of CE2 calculates its result value: 1.2. As long as there is no change in the input value for node of CE2, this result value remains the same. This result value is sent to node 2 of CE4 (node identified by the timestamp value 2.4). This result value calculated by node 2 of CE4 will also remain the same as long as its input value does not change.

Thus, node 3 of CE1 does not play a role in sending result values, based upon the earlier mentioned rule. Therefore, because there is no change in result values, none of the nodes in table 3 of the present example will ever reach the final state of this method.

Therefore, result of the described procedure with respect to distributed garbage collection is that a stable situation has been formed. As a result of the continual presence of the result value of root 1 of CE1, a possible circulation of a lexicographically maximum result value is blocked as is shown in Table 3. It is to be noted that in the present example, no result value is transmitted which is composed on the basis of node 3 of CE1 with timestamp 2.1, since a root-result value of node 1 of CE1 is already being transmitted to node 2 of CE2, as has previously been described.

It will now be demonstrated that, if the reference is removed from the root object, the dead objects will also be removed. In this connection it is started from the situation obtained by the preceding example.

Table 4 illustrates the course of the distributed garbage collection action. Each object is again indicated by its timestamp and computer unit. It has been assumed, in agreement with Table 4, that computer unit CE1 is the first to perform a garbage collection after removing the reference from the root (local identifier 1) to the object along with local node identifier 2 of CE1. Upon marking living objects from object 1.1 no remote reference is no longer found. Thus, no result value will be determined on the basis of object 1.1. Upon marking living objects from objects which occur in the entrance table, a remote reference is still found for which, however, no root-result value is apparent. The result value of local object 3 of CE1, denoted in the table by its timestamp 2.1, is necessary. After a number of steps the relevant nodes reach the definitive final condition 45. As a result of this, they are removed from the entrance table and in a local garbage collection they will then be definitely removed from memory to thereby free memory space. Herewith it is demonstrated that the method of FIG. 3 according to the second preferred embodiment of the present invention, is effective on cyclic structures (with timestamps) in which subcycles occur.

It will subsequently be demonstrated that the method of the second preferred embodiment of the present invention remains effective correctly in situations in which remote references are lost between objects by causes beyond garbage collection actions. When a reference is lost this means that, for the graph in question, an edge has disappeared. In the packetwise transmission of a timestamp result values for distributed garbage collection, the result values at the receiving end will normally be assigned to the relevant variables, the old value being replaced each time by the new value, as previously described. When an edge disappears, during the next packetwise transmission of the references, the reference associated with the disappeared edge will be lacking for the first time. The receiving computer unit then removes the identifier of the referring computer unit from its entry of the entrance table and, in case this is the only referring computer unit for the entry, the entry is removed from the entrance table. Should there be no further local references to the object, then the object will be removed in a local garbage collection. However, when there are still other remote references for the entry, the lacking of a result value, for the first time, for the node will involve, with respect to the method of FIG. 3, an "empty" result value being received.

TABLE 4

| | CE1 2.1 | CE2 1.2 |
|---|---|---|
| 31 | P'{2.4, 1.2} | P'{2.4-2.1} |
| 32 | P'{2.4, 1.2} | P'{2.4-2.1} |
| 33 | Ref=2.4 | Ref=2.4-2.1 |
| 34 | P'{2.4, 1.2} | P'{2.4-2.1} |
| 35 | no | yes |
| 37 | — | no |
| 38 | — | — |
| 39 | — | Res=2.4-2.1-1.2* |
| 40 | no | — |
| 41 | — | — |
| 42 | Res=2.4-2.1 | — |
| 44 | no | no |
| 45 | — | — |

| | CE4 2.4 | CE1 2.1 |
|---|---|---|
| 31 | P'{2.4-2.1-1.2*} | P'{2.4-2.1-1.2*, 2.4} |
| 32 | P'{2.4-2.1-1.2*} | P'{2.4-2.1-1.2*, 2.4} |
| 33 | Ref=2.4 | Ref=2.4-2.1 |
| 34 | P'{2.4-2.1} | P'{2.4-2.1, 2.4} |
| 35 | no | yes |
| 37 | — | no |
| 38 | — | — |
| 39 | — | Res=2.4-2.1* |
| 40 | no | — |
| 41 | — | — |
| 42 | Res=2.4 | — |
| 44 | no | no |
| 45 | — | — |

| | CE2 1.2 | CE4 2.4 |
|---|---|---|
| 31 | P'{2.4-2.1*] | P'{2.4-2.1*} |
| 32 | P'{2.4-2.1*} | P'{2.4-2.1*} |
| 33 | Ref=2.4-2.1* | Ref=2.4 |
| 34 | P'{2.4} | P'{2.4} |
| 35 | yes | yes |
| 37 | yes | no |

TABLE 4-continued

| | | |
|---|---|---|
| 38 | Res=2.4-2.1* | — |
| 39 | — | Res=2.4 |
| 40 | — | — |
| 41 | — | — |
| 42 | — | — |
| 44 | no | yes |
| 45 | — | terminated |

| | CE1 2.1 | CE2 1.2 |
|---|---|---|
| 31 | P'{2.4-2.1*, 2.4*} | P'{2.4*} |
| 32 | P'{2.4*} | P'{2.4*} |
| 33 | Ref=2.4* | Ref=2.4* |
| 34 | P'{ } | P{ } |
| 35 | yes | yes |
| 37 | yes | yes |
| 38 | Res=2.4* | Res=2.4* |
| 39 | — | — |
| 40 | — | — |
| 41 | — | — |
| 42 | — | — |
| 44 | yes | yes |
| 45 | terminated | terminated |

The steps of FIG. 7 which relate to the receiving of an empty result value, will be described in greater detail by the following example. Let it be assumed that the reference disappears from 2.4 (local node 2 of CE4) to 2.1 (local node 3 of CE1). Except in optional garbage collection actions, this can happen only if the root is still present. Let it then be assumed that CE4 performs a local garbage collection. This now transmits an empty result value to CE1. Upon "receipt" of this empty result value the steps of the flow diagram of FIG. 7 are performed. Intermediate results hereof are recorded in Table 5. Its timestamp will then be increased as will be subsequently explained.

Starting from the initial situation 70, when the packet-wise transmitted result values are received, it will be tested for a certain node in step 71 whether the received result value is empty, in other words whether in the packet of result values a result value is lacking for the first time. This is the case here as local node 3 of CE1 receives only a value from local node 1 of CE2 and none from local node 2 of CE4. In step 73 the result value of the referring node received at an earlier instant is then removed after a result value has been computed on the basis hereof. This computation is recorded for the present situation in the left-hand column of FIG. 5 with statement of the intermediate results and yields as result value of 2.4-2.1. This is the old result value. The same computation is then carried out in step 74 but this time on the basis of the received empty result value, so that it holds that: P'=P'{1.2}. This provides as a result value of 2.1. This computation is recorded in the second column of Table 5. The last obtained result value is compared in step 75 with the result value computed in step 73. If the newly computed result value is less in value than the old result value, the timestamp of the present node will be increased in step 76 until the newly computed value is larger in value than the old result value. In the present example the newly computed result value is indeed initially smaller. Therefore, the timestamp is subsequently increased in step 76 to 3.1. Renewed computation of the result value on the basis of this timestamp is recorded in the third column of Table 5. This result value is now larger in value than the old result value computed in step 73. This is established in step 75, after which the final state 77 is reached. 3.1 is the result value which, in a subsequent local garbage collection on CE1, is transmitted to CE2, with the reference between root 1.1 and node 3.1 (the former node 2.1) being removed. If, in that case, further garbage collection actions are carried out, the graph is broken down. By increasing the timestamp it is prevented that, in case the reference from the root 1 of CE1 would disappear from node 3 of CE1, a result value of the form 2.4-2.1 starts circulating in the cycle formed by the nodes 3 on CE1 and 2 on CE2, with timestamps 2.1 and 1.2, respectively. The cycle cannot be detected because detection is initiated by the node which, inter alia, regains its own timestamp again in step 33 as a reference value. By these measures, the methods of the preferred embodiments of the present invention are also suitable for use when references are removed.

TABLE 5

| | CE1 2.1 | CE1 2.1 | CE 3.1 ←renewed timestamp |
|---|---|---|---|
| 31 | P'{2.4,1.2} | P'{1.2} | P'{1.2} |
| 32 | P'{2.4,1.2} | P'{1.2} | P'{1.2} |
| 33 | Ref=2.4 | Ref=0 | Ref=0 |
| 34 | P'{2.4,1.2} | P'{1.2} | P'{1.2} |
| 35 | no | no | no |
| 37 | — | — | — |
| 38 | — | — | — |
| 39 | — | — | — |
| 40 | no | no | no |
| 41 | — | — | — |
| 42 | Res=2.4-2.1 | Res=2.1 | Res=3.1 |
| 44 | no | no | no |
| 45 | — | — | — |

Situations are also feasible in which new references are created. The methods of the preferred embodiments of the present invention may still be used also in these dynamic situations by using timestamps. When a new reference is created to an already existing object, then the timestamp of the object is renewed, as appears from the flow diagram of FIG. 6. This plays a part, inter alia, when root objects are moving, which will be described in more detail with reference to the situation to be considered stationary which is reached via the steps shown in Table 3.

Let it be assumed that a root is moving by first creating a remote reference, for example, to local object 2 of CE2, and then deleting the local reference. The root then migrates to CE2. This provides a stationary situation in which the maximum of the cycle is now blocked at node 2, timestamp 1.2, of CE2. However when the root moves further, the maximum is blocked for local node 2, timestamp 2.4 of CE4. When the root then moves again, the maximum returns to the node where it was formed. Thus, the result is that the graph will be broken down from here on. This now has been prevented by the measures shown in the flow diagram of FIG. 6, in which it is ensured that when a new reference is added, the timestamp of the node to which the reference refers, is renewed. The distributed garbage collection action will then be restarted each time this occurs.

It will be understood that the described methods of the present invention, in which a node can determine asynchronously and incrementally whether the digraph, of which the node forms a part, still has a given status, the status being determined by a node which undertakes the role of "root", may also be used in other fields where structures in the form of a digraph occur. To be considered in this connection are documents which comprise links to other documents, or distributed hypertext media.

It should further be noted that the system and methods of the present invention could, while described as a plurality of operations performed by a CPU in connection with random access memories and read only memories, also be implemented, by one of ordinary skill in the art, in hardware such as adders, comparitors, shift registers, etc. Such implementation would sacrifice the flexibility of the software, but would result in the performance benefits that hardware provides. Hardware assets to system and methods such as those described in the present invention can greatly improve performance. Writable microcodes storage for the pieces of code that are frequency run, hardware assets for graphics, or hardware assets for fetching of codes, in connection with the system and methods of the present invention, could all potentially improve the performance of implementation of the system and methods of the present invention.

From the above-described embodiments of the present invention, it is apparent that the present invention may be modified as would occur to one of ordinary skill in the art without departing from the spirit and scope of the present invention which should be defined solely by the appendant claims. Changes and modifications of this system contemplated by the present preferred embodiments will be apparent to one of ordinary skill in the art.

What is claimed is:

1. A method of garbage collecting inaccessible information to reclaim memory space previously occupied in a memory of a logically organized computer network system including an assembly of groups of related entities, each of the groups being represented by a digraph without subcycles and each of the entities being represented by a node of the digraph, by distributing status information regarding the digraph over each of the nodes of the digraph, in which an identifier of a unique value is associated with each node, per digraph, and in which a set of elements is associated with each node not having a particular status, each element representing a variable which is coupled separately to an immediate predecessor of the associated node, the method comprising the steps of:

(a) assigning the value of the identifier of a node having a particular status to each variable coupled to the node;
    (b) assigning the value of the identifier of a node without a particular status to each variable which is coupled to the node if the identifier satisfies a predetermined comparison criterion with respect to the variables of the set associated with the node;
    (c) assigning the value of a variable of the set associated with a node to each variable which is coupled to the node, if all the variables of the set associated with the node are identical and the identifier of the node fails to satisfy the predetermined comparison criterion of step (b); and
    (d) removing each variable which is coupled to the node if, in the set associated with the node, each variable is equal to the value of the identifier of the node or the set associated with the node is empty to thereby remove information from memory which has been determined to be inaccessible.

2. The method of claim 1 wherein the predetermined comparison criterion is satisfied if the value of the identifier of the node is greater than the value of each variable of the set associated with the node.

3. The method of claims 1 or 2, wherein the node is garbage collected and removed as being a dead node if the value of each variable in the set associated with the node is equal to the value of the identifier of the node, or if the set associated with the node is empty.

4. A method of removing information, corresponding to inaccessible data, from memory of a logically organized system of groups of related entities, each of the groups being represented by a digraph and each of the entities being represented by a node of the digraph, by distributing status information regarding the digraph over each of the nodes of each digraph, an identifier of a unique value being associated with each node, per digraph, and a set of elements being associated with each node not having a particular status, each element of the set representing a variable which is coupled separately to an immediate predecessor of the associated node, the variables including a sequential row of identifiers of nodes, the method comprising the steps of:

(a) assigning, for each node having a particular status, the value of the identifier of the node to each variable which is coupled to the node;
    (b) performing a series of steps for each node which does not have a particular status, on the basis of the variables associated with the node, the series of steps including,
        (1) removing each variable associated with the node, wherein a predetermined portion of said each variable comprises another variable associated with the node, said another variable including an identifying mark;
        (2) determining a reference value by selecting a variable which is a lexicographic extreme value of all variables associated with the node, and sequentially removing, from the selected variable, each identifier in the row including an identifying mark if present, which fulfills a comparison criterion with respect to the identifier of the node, until an identifier in the row fails to satisfy the comparison criterion,
        (3) deriving a result value from the remaining variables associated with the node and from the determined reference value,
        (4) assigning the result value to each variable coupled to the node, and
        (5) removing the node from memory of the logically organized system as information corresponding to inaccessible data, if the result value contains a row of only one identifier and an identifying mark, the node thereby obtaining certainty of status in relation to the digraph.

5. The method of claim 4, wherein the variables are copied from the set of variables associated with a node to form a replica set, after which the steps b(1)-b(5) to be carried out for each node not having a particular status, are carried out on the variables of the replica set.

6. The method of claim 4 or 5, wherein the identifier of a unique value to be associated with each node per digraph includes a timestamp, wherein the method further comprises the steps of:

(a) associating a timestamp with a node at an instant where coupling is created with the node; and
    (b) changing the timestamp of a node such that a result value is obtained which is larger than a previously obtained result value in the case of an empty result value previously received from an immediate predecessor node.

7. The method of claim 4 or 5, wherein the predefined portion of the variable is a prefix, having a defined identifier location being a sequentially initial part of a row.

8. The method of claim 4 or 5, wherein said lexicographic extreme value is a lexicographic maximum and when a variable is selected which lexicographically is maximal of all variables associated with the node, a row including an identifying mark is lexicographically larger than a row without an identifying mark which is otherwise equal to the row and wherein, with respect to the comparison criterion, an identifier, including an identifying mark, if present, is removed from the row when the identifier is smaller in value than the value of the identifier of the node.

9. The method of claim 4 or 5, wherein step b(3) of deriving the result value from the remaining variables and the resulting reference value comprises the steps of:
 (a) removing, from each row which includes an identifier with an identifying mark, both the last sequential identifier in the row and the identifying mark;
 (b) comparing all the variables, associated with the node, with the reference value, by a method including the steps of,
  (1) determining the result value as that of the reference value if the row of identifiers of each variable is equal to identifiers forming an initial portion of the row of the reference value and the reference value includes an identifying mark,
  (2) determining the result value by adding the identifier of the node sequentially at the end of the row of the reference value, if not previously present, and an identifying mark if the row of identifiers of each variable is equal to identifiers forming an initial portion of the row of the reference value and the reference value does not include an identifying mark,
  (3) determining the result value by adding the value of the identifier of the node sequentially at the end of the row of the reference value, if not previously present, if there is at least one variable, the row of which is not equal to identifiers forming an initial portion of the row of the reference value and the reference value also does not include an identifying mark, and
  (4) determining the result value by removing the identifying mark from the reference value and replacing the last sequential identifier of the reference value row with the identifier of the node if there is at least one variable, the row of which is not equal to identifiers forming an initial portion of the row of the reference value and the reference value also includes an identifying mark.

10. The method of claim 9 wherein the logically organized system is constructed as an object-oriented system in which the objects represent the entities, root objects represent entities having a particular status, and in which the identifier of a unique value associated with each node, per digraph, includes a timestamp, and wherein a variable is selected which is of a lexicographically maximal extreme value, a row of identifiers including an identifying mark being lexicographically larger than a row of identifiers with values equal to the row without an identifying mark, and, with reference to the comparison criterion, each identifier and the identifying mark, if present, is removed from the row if the value of the identifier is smaller in value than the value of the identifier of the node, the method further comprising the steps of:
 associating a timestamp with a node at an instant when coupling is created to the node;
 altering the timestamp of a node, as is necessary, to obtain a result value which is larger than a previously obtained result value in the case of an empty result value previously being received from an immediate predecessor node; and
 removing the node from memory of the object-oriented system when the result value, associated with the node, contains a row of only one identifier and an identifying mark, after the result value has been assigned to the variables coupled to the node.

11. The method of claim 10, wherein the object oriented system is constructed as a distributed object oriented system, in which objects belonging to an entrance graph are arranged groupwise and in which the distributed object-oriented system comprises:
 one or more computer units connected by communication channels, wherein the result values obtained, per computer unit and destined for objects present on the same subsequent computer, are transmitted packetwise, the omission of a variable in the packet resulting in assignment of an empty result value to the variable.

12. A device for removing garbage to reclaim memory space previously occupied, for use in a logically organized system including an assembly of groups of related entities, each of the groups being represented by digraphs without subcycles and each of the entities being represented by a node of the digraph in which an identifier of a unique value is associated with each node, per diagraph, and in which a set of elements is associated with each node not having a particular status, each element representing a variable which is coupled separately to an immediate predecessor of the node, the device comprising:
 means for assigning the value of the identifier of a node having a particular status to each variable coupled to the node;
 means for assigning the value of the identifier of a node, without a particular status, to each variable which is coupled to the node if the identifier satisfies a predetermined comparison criterion with respect to the variables of the set associated with the node;
 means for assigning the value of a variable of the set associated with a node to each variable which is coupled to the node, if all the variables of the set associated with the node are identical and the identifier of the node fails to satisfy the predetermined comparison criterion with respect to the last-mentioned variables; and
 means for removing each variable which is coupled to the node, if in the set associated with the node, each variable is equal to the value of the identifier of the node or the set associated with the node is empty to thereby collect garbage by removing information from the memory which is no longer accessible via a node.

13. A device for removing information from memory, which is no longer accessible, to reclaim memory space in a logically organized system, the logically organized system including an assembly of groups of related entities, each of the groups being represented by digraphs and each of the entities being represented by a node of the digraph, an identifier of a unique value being associated with each node, per digraph, and a set of elements being associated with each node not having a particular status, of which set each element representing a variable which is coupled separately to an immediate predecessor of the node, the variable including a sequential row of identifiers of nodes, the device comprising:

means for assigning, for each node having a particular status, the value of the identifier of the node to each variable which is coupled to the node; and means for performing a series of steps for each node not having a particular status, on the basis of the set of variables associated with the node, the series of steps including, (a) removing each variable associated with the node, wherein a predefined portion of said each variable comprises another variable associated with the node, said another variable including an identifying mark, (b) determining a reference value by selecting a variable which is a lexicographic extreme value of all variables associated with the node, and sequentially removing, from the selected variable, each identifier in the row including an identifying mark if present, which fulfills a comparison criterion with respect to the identifier of the node, until an identifier in the row fails to satisfy the comparison criterion, (c) deriving a result value from the remaining variables associated with the node and from the determined reference value, (d) assigning the result value to each variable coupled to the node, and (e) removing the node from memory of the logically organized system as information corresponding to inaccessible data, if the result value contains a row of only one identifier and an identifying mark, the node thereby obtaining certainty of status in relation to the digraph.

14. The device of claim 13, wherein the predefined portion of the variable to be removed is a prefix, having a defined identifier location being a sequentially initial part of the row.

15. The device of claim 13, wherein said lexicographic extreme value is a lexicographic maximum.

* * * * *